(12) United States Patent
Yamaguchi et al.

(10) Patent No.: US 9,546,869 B2
(45) Date of Patent: *Jan. 17, 2017

(54) VIBRATOR ELEMENT, METHOD OF MANUFACTURING VIBRATOR ELEMENT, VIBRATOR, ELECTRONIC DEVICE, ELECTRONIC APPARATUS AND MOVING BODY

(71) Applicant: Seiko Epson Corporation, Tokyo (JP)

(72) Inventors: Keiichi Yamaguchi, Ina (JP); Seiichiro Ogura, Minowa (JP); Takayuki Kikuchi, Okaya (JP); Ryuta Nishizawa, Matsumoto (JP); Seiji Osawa, Minowa (JP)

(73) Assignee: Seiko Epson Corporation (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/097,869

(22) Filed: Apr. 13, 2016

(65) Prior Publication Data

US 2016/0223328 A1    Aug. 4, 2016

Related U.S. Application Data

(63) Continuation of application No. 13/947,468, filed on Jul. 22, 2013, now Pat. No. 9,341,643.

(30) Foreign Application Priority Data

Jul. 23, 2012    (JP) .................................. 2012-162384

(51) Int. Cl.
*G01C 19/56* (2012.01)
*G01C 19/5621* (2012.01)
(Continued)

(52) U.S. Cl.
CPC ....... *G01C 19/5607* (2013.01); *G01C 19/5621* (2013.01); *G01C 19/5628* (2013.01);
(Continued)

(58) Field of Classification Search
CPC ........ G01P 9/04; G01C 19/5621; Y10T 29/49; Y10T 74/12
(Continued)

(56) References Cited

U.S. PATENT DOCUMENTS

| 6,418,789 B1 | 7/2002 | Ishitoko et al. |
| 7,207,221 B2 | 4/2007 | Kawauchi et al. |

(Continued)

FOREIGN PATENT DOCUMENTS

| JP | 2003-332872 A | 11/2003 |
| JP | 2006-105614 A | 4/2006 |

(Continued)

*Primary Examiner* — J M Saint Surin
(74) *Attorney, Agent, or Firm* — Harness, Dickey & Pierce, P.L.C.

(57) ABSTRACT

A vibrator element includes a pair of first and second drive vibrating arms that extend in opposite directions from a base portion; a first weight that is spaced from a tip of at least one of the first and second drive vibrating arms toward the base portion and is provided in a first region of the at least one of the drive vibrating arms; and a second weight that is provided in a second region that is a region between a tip of the first weight and the tip of the at least one of the drive vibrating arms. When an area of the first region is represented as A1, a mass of the first weight is represented as B1, an area of the second region is represented as A2, and a mass of the second weight is represented as B2, B1/A1>B2/A2 is established.

20 Claims, 13 Drawing Sheets

(51) Int. Cl.
  *G01C 19/5628* (2012.01)
  *G01C 19/5607* (2012.01)
(52) U.S. Cl.
  CPC .................. *G01P 9/04* (2013.01); *Y10T 29/49* (2015.01); *Y10T 74/12* (2015.01)
(58) Field of Classification Search
  USPC .......................................................... 73/662
  See application file for complete search history.

(56) References Cited

U.S. PATENT DOCUMENTS

| | | | |
|---|---|---|---|
| 7,412,885 B2 | 8/2008 | Ogura | |
| 7,764,145 B2 | 7/2010 | Iwai | |
| 8,539,833 B2 | 9/2013 | Amemiya | |
| 8,561,467 B2 * | 10/2013 | Kobayashi | G01C 19/574 73/504.12 |
| 8,783,104 B2 * | 7/2014 | Nishizawa | G01C 19/5642 73/504.12 |
| 8,973,440 B2 * | 3/2015 | Matsumoto | H03H 9/02 73/504.12 |
| 9,013,093 B2 * | 4/2015 | Yamaguchi | H01L 41/053 310/348 |
| 9,030,082 B2 | 5/2015 | Ogura et al. | |
| 9,222,776 B2 * | 12/2015 | Ishii | G01C 19/5607 |
| 9,341,643 B2 * | 5/2016 | Yamaguchi | G01P 9/04 |
| 2002/0100322 A1 | 8/2002 | Ebara et al. | |
| 2008/0178673 A1 | 7/2008 | Tateyama et al. | |
| 2011/0156827 A1 | 6/2011 | Kawai | |
| 2014/0077664 A1 | 3/2014 | Ogura et al. | |

FOREIGN PATENT DOCUMENTS

| | | |
|---|---|---|
| JP | 2006-201011 A | 8/2006 |
| JP | 2007-071706 A | 3/2007 |
| JP | 2008-151633 A | 7/2008 |
| JP | 2008-160824 A | 7/2008 |
| JP | 2008-301111 A | 12/2008 |
| JP | 2010-256332 A | 11/2010 |
| JP | 2011-155629 A | 8/2011 |
| JP | 2012-023528 A | 2/2012 |

\* cited by examiner

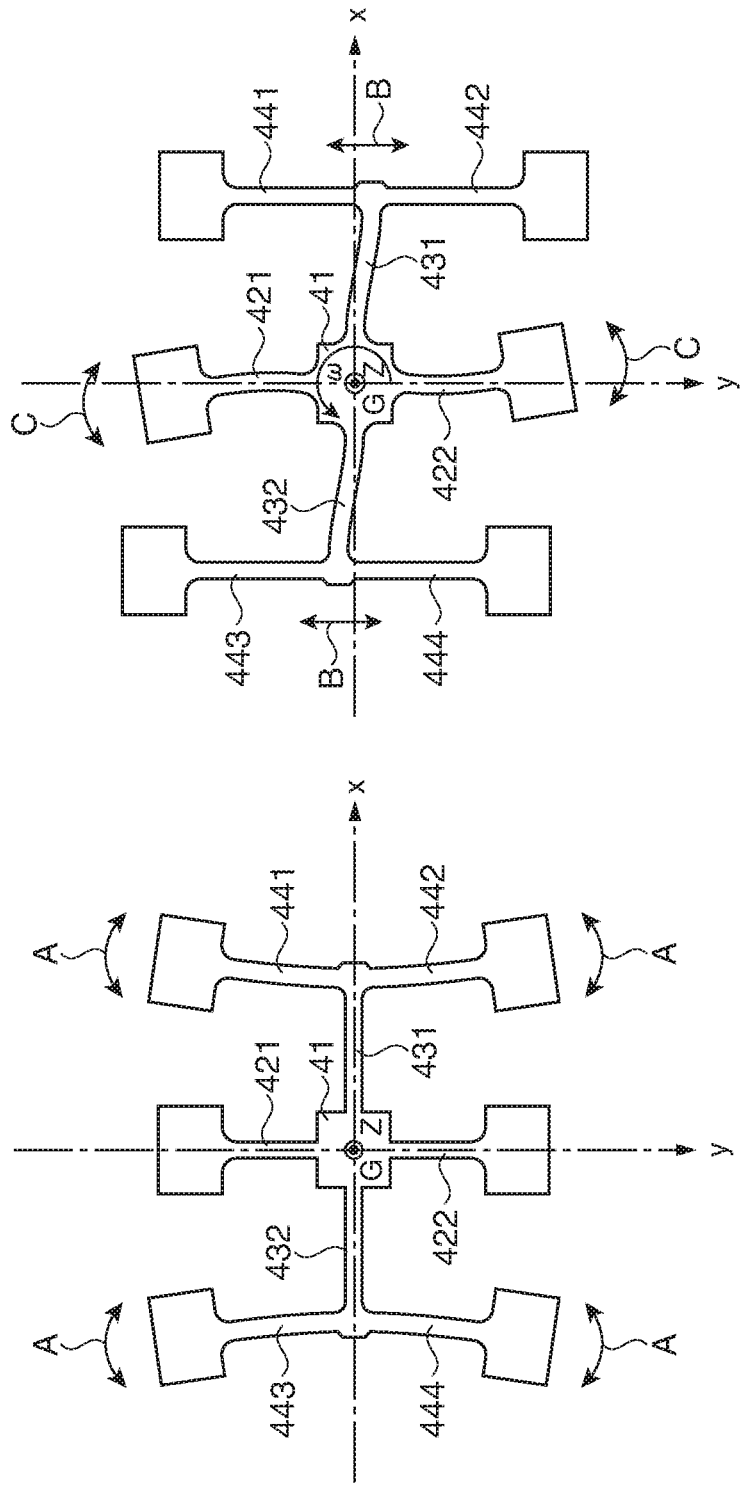

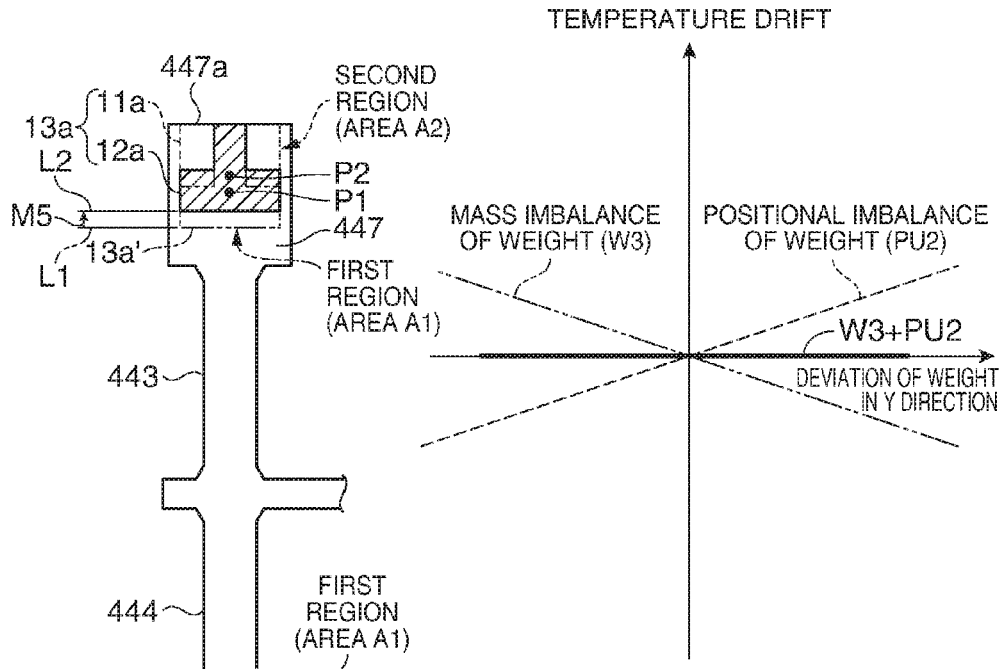
FIG. 7A
FIG. 7B
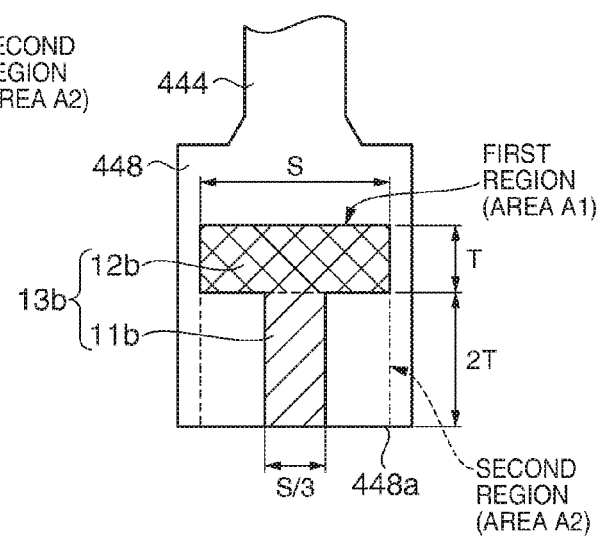
FIG. 7C

VIBRATOR ELEMENT, METHOD OF MANUFACTURING VIBRATOR ELEMENT, VIBRATOR, ELECTRONIC DEVICE, ELECTRONIC APPARATUS AND MOVING BODY

CROSS-REFERENCE TO RELATED APPLICATIONS

This is a continuation patent application of U.S. patent application Ser. No. 13/947,468 filed Jul. 22, 2013 which claims priority to Japanese Patent Application No. 2012-162384 filed Jul. 23, 2012, both of which are hereby expressly incorporated by reference in their entireties.

BACKGROUND

1. Technical Field

The present invention relates to a vibrator element, a method of manufacturing the vibrator element, a vibrator, an electronic device, an electronic apparatus and a moving body.

2. Related Art

In the related art, a so-called "double T-shaped" gyro element has been proposed as a vibrator element that detects an angular velocity (for example, refer to JP-A-2006-105614).

A gyro element disclosed in JP-A-2006-105614 includes a base portion, first and second detection vibrating arms (detection arms) that extend from opposite sides of the base portion along a y axis direction, first and second connection arms (connection arms) that extend from opposite sides of the base portion along an x axis direction, first and second drive vibrating arms (driving arms) that extend from opposite sides of the first connection arm along the y axis direction, and third and fourth drive vibrating arms (driving arms) that extend from opposite sides of the second connection arm along the y axis direction.

Further, a weight layer that is provided from the tip of each drive vibrating arm toward the base portion is provided at the tip portion of each of the first, second, third and fourth drive vibrating arms. The weight layer is a mass adjusting film used for adjustment of a resonance frequency (hereinafter, referred to as a frequency adjustment) of each drive vibrating arm, and is formed by a deposition method that uses a deposition mask, or the like. The frequency adjustment is performed by adjusting the resonance frequency of each drive vibrating arm into a predetermined value by removing at least a part of the weight layer using a laser beam or the like, for example.

However, in a case where the weight layer of each drive vibrating arm is formed by the deposition method that uses the deposition mask, or the like, an installation position of the deposition mask may deviate. In particular, in a case where the installation position of the deposition mask deviates in the extension direction (y axis direction) of each drive vibrating arm (vibrating arm), for example, in the first drive vibrating arm and the second drive vibrating arm in which the respective drive vibrating arms extend from the opposite sides of the base portion (in opposite directions), the weight layer of the first vibrating arm becomes large and the weight layer of the second vibrating arm becomes small.

In this way, in a case where the installation position of the deposition mask deviates in the extension direction (y axis direction) of each drive vibrating arm, the sizes and masses of the weight layers formed in the drive vibrating arms that extend in opposite directions become different from each other (form imbalance). That is, the positions of the centers of gravity and masses of the weight layers provided in the respective drive vibrating arms that extend in opposite directions become different from each other. Thus, the vibration balance of the drive vibrating arms that extend in opposite directions is broken, and a frequency temperature characteristic is deteriorated. Thus, a so-called temperature drift occurs.

SUMMARY

An advantage of some aspects of the invention is to solve at least a part of the problems described above, and the invention can be implemented in the following forms or application examples.

APPLICATION EXAMPLE 1

This application example is directed to a vibrator element including: a base portion; a pair of vibrating arms that extends in opposite directions from the base portion; a first weight that is spaced from a tip of at least one vibrating arm toward the base portion and is provided in the at least one vibrating arm; and a second weight that is provided in a region between a tip of the first weight and the tip of the at least one vibrating arm, in which when a region where the first weight is provided is represented as a first region and a region between the tip of the first weight and the tip of the at least one vibrating arm is represented as a second region, an area of the first region is represented as A1 and a mass of the first weight is represented as B1, and an area of the second region is represented as A2 and a mass of the second weight is represented as B2, B1/A1>B2/A2 is established.

The present inventors found that in the correlation between a weight layer (weight including a first weight and a second weight) provided in a vibrating arm and temperature drift of a vibrator element, there are the influence on temperature drift due to a positional imbalance of the center of gravity of the weight layer (position change of the weight layer) and the influence on temperature drift due to a mass imbalance of the weight layer. Here, the temperature drift refers to a change in frequency of the vibrator element with respect to temperature change.

Specifically, the mass imbalance of the weight layer has a large influence on the temperature drift compared with the positional imbalance of the weight layer, and the influence on the temperature drift is large as the position of the weight layer is close to the tip of the vibrating arm. Further, the correlation between the mass imbalance of the weight layer and the temperature drift of the vibrator element has a negative inclination, and the correlation between the positional imbalance of the weight layer and the temperature drift of the vibrator element has a positive inclination. That is, by using the weight layer having the above-mentioned configuration, the temperature drift due to the mass imbalance of the weight layer and the temperature drift due to the influence of the positional imbalance of the weight layer are offset, and thus, it is possible to reduce the occurrence of the temperature drift.

In the vibrator element of the application example, since the pair of vibrating arms extends from the base portion in opposite directions, in a case where an installation position of a deposition mask deviates in an extension direction of the respective vibrating arms, the positions of the first weights provided in the respective vibrating arms deviate toward a tip side at one vibrating arm and deviate toward a base portion side at the other vibrating arm.

Here, the first weight is provided in the first region of the vibrating arm to be spaced from the tip of the vibrating arm, and the second weight is provided in the second region that is an entire region between the first weight and the tip of the vibrating arm, that is, is provided from the first weight toward the tip side of the vibrating arm. When the area of the first region is represented as A1, the mass of the first weight is represented as B1, the area of the second region is represented as A2, and the mass of the second weight is represented as B2, $B1/A1>B2/A2$ is established.

According to this configuration, the mass of the second weight having a large influence on the occurrence of the temperature drift of the vibrator element is reduced, and thus, the negative inclination in the correlation between the mass imbalance and the temperature drift of the vibrator element is decreased. At this time, since the first weight forms position deviation inside both the vibrating arms, even though the influence on the temperature drift of the vibrator element due to the positional imbalance results, the positive inclination is not changed in the correlation between the positional imbalance and the temperature drift of the vibrator element.

According to the above-described configuration, the decreased negative inclination in the correlation between the mass imbalance of the second weight and the temperature drift of the vibrator element and the originally small positive inclination in the correlation between the positional imbalance of the first weight and the temperature drift of the vibrator element are approximately the same in positive and negative values. Thus, the correlation between the mass imbalance and the temperature drift of the vibrator element and the correlation between the positional imbalance and the temperature drift of the vibrator element are offset, and thus, in a case where the installation position of the deposition mask deviates in the extension direction of the respective vibrating arms, that is, in a case where the positions of the first weight and the second weight provided in each vibrating arm deviate, it is possible to suppress the occurrence of the temperature drift of the vibrator element.

This configuration may be applied to both vibrating arms, but may also be applied to one vibrating arm of the pair of vibrating arms that is positioned on an opposite side to the deviation direction of the weight. In this case, it is similarly possible to achieve the above effect. That is, the weight having this configuration may be applied to one vibrating arm that is positioned on the opposite side to the deviation direction of the weight.

APPLICATION EXAMPLE 2

This application example is directed to the vibrator element of the application example described above, wherein the second weight has a width smaller than that of the first weight in a direction that is orthogonal to an extension direction of the at least one vibrating arm.

According to this application example, it is possible to decrease the negative inclination in the correlation between the mass imbalance of the second weight having a large influence on the occurrence of the temperature drift of the vibrator element and the temperature drift of the vibrator element. In other words, even in a case where the positions of the first weight and the second weight provided in each vibrating arm deviate as the installation position of the deposition mask deviates in the extension direction of the respective vibrating arms, for example, it is possible to suppress the occurrence of the temperature drift of the vibrator element.

APPLICATION EXAMPLE 3

This application example is directed to the vibrator element of the application example described above, wherein the second weight is provided in an approximately central portion of the at least one vibrating arm in a direction that is orthogonal to an extension direction of the at least one vibrating arm.

According to this application example, the balance of the second weight in the width direction of the vibrating arm is achieved, and thus, it is possible to further suppress the influence on the temperature drift of the vibrator element.

APPLICATION EXAMPLE 4

This application example is directed to the vibrator element of the application example described above, wherein the second weight includes a plurality of third weights.

According to this application example, since the second weight includes the plurality of third weights, it is possible to decrease the negative inclination in the correlation between the mass imbalance of the second weight having a large influence on the occurrence of the temperature drift of the vibrator element and the temperature drift of the vibrator element.

APPLICATION EXAMPLE 5

This application example is directed to the vibrator element of the application example described above, wherein the first weight is provided to have a gap with respect to side ends of the at least one vibrating arm along an extension direction of the at least one vibrating arm.

According to this application example, even in a case where the installation position of the deposition mask deviates in the width direction of the respective vibrating arms, since there is the gap between the first weight and the side ends of the vibrating arm, it is possible to suppress the first weight from going outside each vibrating arm. Thus, even in a case where the first weight deviates in the width direction of each vibrating arm, it is possible to prevent the occurrence of mass change of the first weight.

APPLICATION EXAMPLE 6

This application example is directed to the vibrator element of the application example described above, wherein the at least one vibrating arm has a wide portion in which the width of a part of the at least one vibrating arm in a direction that is orthogonal to an extension direction of the at least one vibrating arm in a plan view is formed to be larger than the width of the other part of the at least one vibrating arm in the direction that is orthogonal to the extension direction of the at least one vibrating arm, and the first weight and the second weight are provided in the wide portion.

According to this application example, it is possible to increase the masses of the first weight and the second weight, and to increase a frequency adjustment range.

APPLICATION EXAMPLE 7

This application example is directed to the vibrator element of the application example described above, wherein a pair of detection vibrating arms that extends from the base portion in opposite directions are provided.

According to this application example, even in a case where the positions of the first weight and the second weight provided in each vibrating arm deviate as the installation position of the deposition mask deviates in the extension direction of the respective vibrating arms, for example, it is possible to provide a gyro vibrator element that is capable of suppressing the occurrence of the temperature drift of the vibrator element.

APPLICATION EXAMPLE 8

This application example is directed to a method of manufacturing a vibrator element, the method including: forming an outer shape that includes a base portion and a pair of vibrating arms that extends in opposite directions from the base portion; forming a first weight on at least one vibrating arm to be spaced from a tip of the at least one vibrating arm toward the base portion and forming a second weight in a region between a tip of the first weight and the tip of the at least one vibrating arm; and adjusting a resonance frequency of the vibrating arm by removing at least a part of at least one of the first weight and the second weight or by increasing the mass of at least one of the first weight and the second weight, in which when a region where the first weight is provided is represented as a first region and a region between the tip of the first weight and the tip of the at least one vibrating arm is represented as a second region, the area of the first region is represented as A1 and the mass of the first weight is represented as B1, and the area of the second region is represented as A2 and the mass of the second weight is represented as B2, B1/A1>B2/A2 is established.

According to this application example, it is possible to manufacture a vibrator element in which the negative inclination in the correlation between the mass imbalance of the second weight having a large influence on the occurrence of the temperature drift of the vibrator element and the temperature drift of the vibrator element is decreased. In other words, even in a case where the positions of the first weight and the second weight provided in each vibrating arm deviate as the installation position of the deposition mask deviates in the extension direction of the respective vibrating arms, for example, it is possible to manufacture a vibrator element that is capable of suppressing the occurrence of the temperature drift of the vibrator element.

APPLICATION EXAMPLE 9

This application example is directed to the method according to the application example described above, wherein the forming of the first weight and the second weight includes: forming the first weight on at least one vibrating arm to be spaced from the tip of the at least one vibrating arm toward the base portion; and forming the second weight in the region between the tip of the first weight and the tip of the at least one vibrating arm.

According to this application example, even in a case where the positions of the first weight and the second weight provided in each vibrating arm deviate as the installation position of the deposition mask deviates in the extension direction of the respective vibrating arms, it is possible to manufacture a vibrator element that is capable of suppressing the occurrence of the temperature drift of the vibrator element. Further, since the first weight and the second weight may be manufactured in separate processes, it is possible to cope with the material difference, thickness difference or the like of the respective weights, for example.

APPLICATION EXAMPLE 10

This application example is directed to a vibrator including: the vibrator element according to any one of the application examples described above; and a package that accommodates the vibrator element.

According to this application example, it is possible to provide a vibrator in which the occurrence of the temperature drift of the vibrator element is suppressed, that is, the temperature characteristic is enhanced.

APPLICATION EXAMPLE 11

This application example is directed to an electronic device including: the vibrator element according to any one of the application examples described above; and a circuit element that has at least a function of driving the vibrator element.

According to this application example, it is possible to provide an electronic device in which the occurrence of the temperature drift is suppressed and the temperature characteristic is enhanced.

APPLICATION EXAMPLE 12

This application example is directed to an electronic apparatus including the vibrator element according to any one of the application examples described above.

According to this application example, since a vibrator element is used in which the occurrence of the temperature drift is suppressed and the temperature characteristic is enhanced, it is possible to provide an electronic apparatus in which a characteristic against temperature change is stabilized.

APPLICATION EXAMPLE 13

This application example is directed to a moving body including the vibrator element according to any one of the application examples described above.

According to this application example, since a vibrator element is used in which the occurrence of the temperature drift is suppressed and the temperature characteristic is enhanced, it is possible to provide a moving body in which a characteristic against temperature change is stabilized.

BRIEF DESCRIPTION OF THE DRAWINGS

The invention will be described with reference to the accompanying drawings, wherein like numbers reference like elements.

FIGS. 1A and 1B are schematic diagrams illustrating an embodiment of a vibrator element and an embodiment of a vibrator that uses the vibrator element according to the invention, in which FIG. 1A is a plan view and FIG. 1B is a front sectional view.

FIGS. 3A and 3B are plan views illustrating driving of a gyro element.

FIGS. 4A and 4B are diagrams illustrating the relationship between a weight and temperature drift of a gyro element in the related art, in which FIG. 4A is a partial plan view illustrating the shape of the weight, and FIG. 4B is a graph illustrating the correlation between the amount of deviation of the weight and the amount of temperature drift.

FIGS. 5A and 5B are diagrams illustrating the relationship between a weight and temperature drift of a gyro element according to the present embodiment, in which FIG. 5A is a partial plan view illustrating the shape of the weight, and FIG. 5B is a graph illustrating the correlation between the amount of deviation of the weight and the amount of temperature drift.

FIGS. 6A and 6B are diagrams illustrating the relationship between a weight and temperature drift of a gyro element according to the present embodiment, in which FIG. 6A is a partial plan view illustrating the shape of the weight, and FIG. 6B is a graph illustrating the correlation between the amount of deviation of the weight and the amount of temperature drift.

FIGS. 7A to 7C are diagrams illustrating the relationship between a weight and temperature drift of a gyro element according to the present embodiment, in which FIG. 7A is a partial plan view illustrating the shape of the weight, FIG. 7B is a graph illustrating the correlation between the amount of deviation of the weight and the amount of temperature drift, and FIG. 7C is an enlarged plan view illustrating details of the shape of the weight.

DESCRIPTION OF EXEMPLARY EMBODIMENTS

Hereinafter, a vibrator element and a vibrator according to the invention will be described in detail on the basis of embodiments shown in the accompanying drawings.
Embodiments First, an embodiment of a vibrator element and an embodiment of a vibrator to which the vibrator element is applied according to the invention will be described.

Figure 1A:
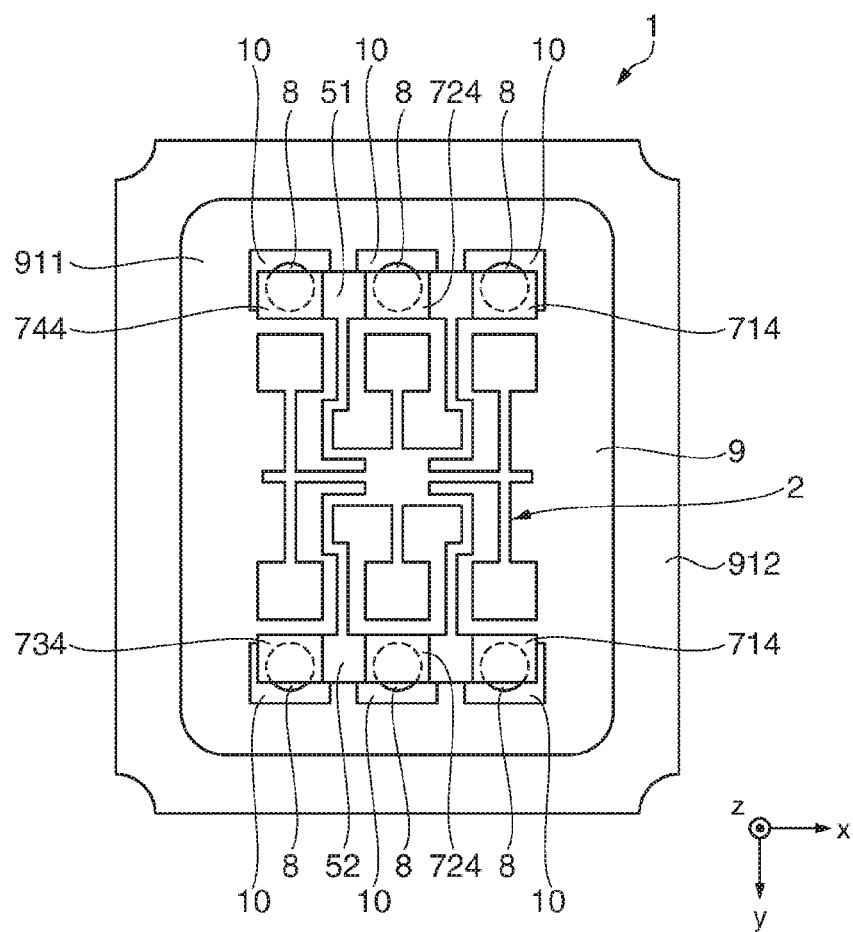
Figure 1B:
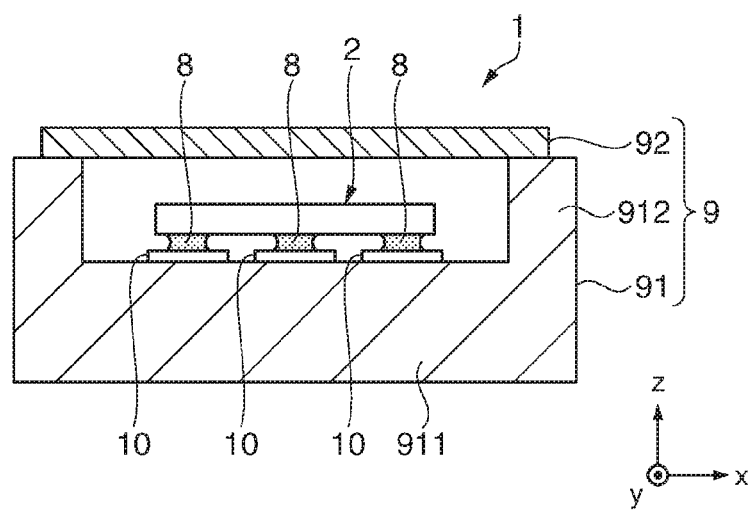
Figure 2:
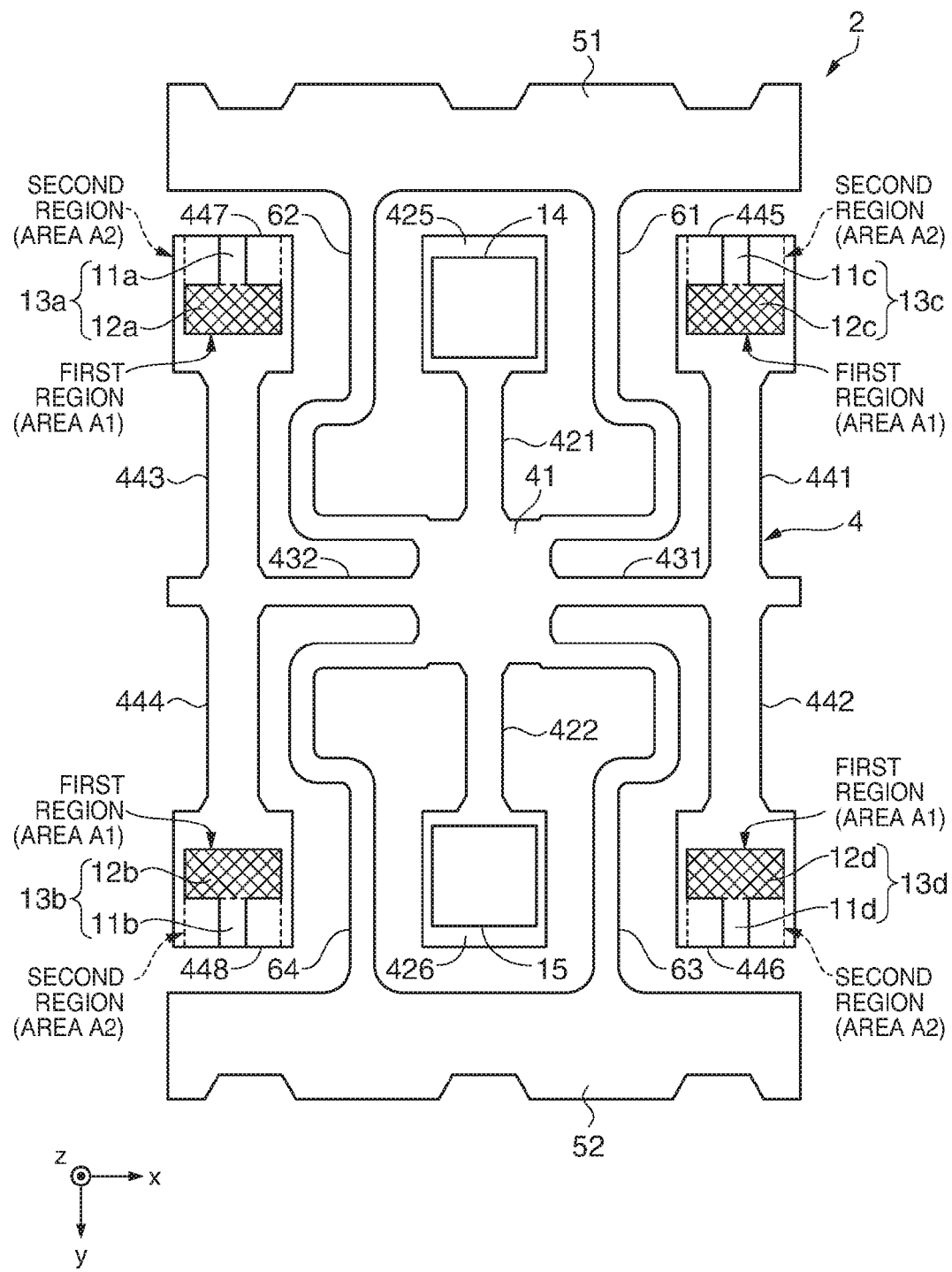
FIG. 2 is a plan view illustrating a gyro element that is a vibrator element included in a vibrator.

FIGS. 1A and 1B are schematic diagrams illustrating embodiments of a vibrator element and a vibrator that employs the vibrator element according to the invention, in which FIG. 1A is a plan view and FIG. 1B is a front sectional view. FIG. 2 is a plan view illustrating a gyro element that is the vibrator element provided in the vibrator shown in FIGS. 1A and 1B. FIGS. 3A and 3B are plan views illustrating driving of a gyro element. Hereinafter, as shown in FIGS. 1A and 1B, three axes that are orthogonal to each other are referred to as an x axis, a y axis and a z axis, and the z axis matches with a thickness direction of a vibration device. Further, a direction parallel to the x axis is referred to as an "x axis direction (second direction)", a direction parallel to the y axis referred to as a "y axis direction (first direction)", and a direction parallel to the z axis is referred to as a "z axis direction".

A vibrator 1 shown in FIGS. 1A and 1B includes a gyro element (vibration element) 2 that is a vibrator element, and a package 9 that accommodates the gyro element 2. Hereinafter, the gyro element 2 and the package 9 will be sequentially described in detail.
Gyro Element FIG. 2 is a plan view of a gyro element that is a vibrator element when seen from an upper side (the side of a lid 92). A detection signal electrode, a detection signal wiring, a detection signal terminal, a detection ground electrode, a detection ground wiring, a detection ground terminal, a driving signal electrode, a driving signal wiring, a driving signal terminal, a driving ground electrode, a driving ground wiring, a driving ground terminal, and the like are provided in the gyro element, but they are not shown in FIG. 2.

The gyro element 2 that is a vibrator element is an "out-of-plane detection" sensor that detects the angular velocity around the z axis, and includes a base material, and plural electrodes, wirings and terminals which are provided on the surface of the base material, although not shown.

The gyro element 2 may be formed of a piezoelectric material such as quartz crystal, lithium tantalite or lithium niobate. Here, quartz crystal is preferably used. Thus, it is possible to obtain the gyro element 2 capable of showing excellent vibration characteristics (frequency characteristics).

The gyro element 2 includes a vibrating body 4 that forms a so-called double T shape, a first support section 51 and a second support section 52 that are support sections that support the vibrating body 4, and a first beam 61, a second beam 62, a third beam 63 and a fourth beam 64 that are beams that connects the vibrating body 4 with the first and second support sections 51 and 52.

The vibrating body 4 is spread on the x-y plane, and has a thickness in the z axis direction. The vibrating body 4 includes a base portion 41 that is positioned at the center thereof, a first detection vibrating arm 421 and a second detection vibrating arm 422 that extend in the y axis direction from both sides of the base portion 41, a first connecting arm 431 and a second connecting arm 432 that extend in the x axis direction from both sides of the base portion 41, a first drive vibrating arm 441 and a second drive vibrating arm 442 that are vibrating arms that extend in the y axis direction from both sides of a tip portion of the first connecting arm 431, and a third drive vibrating arm 443 and a fourth drive vibrating arm 444 that are vibrating arms that extend in the y axis direction from both sides of a tip portion of the second connecting arm 432. Weight sections (hammerheads) 425, 426, 445, 446, 447 and 448 that are approximately quadrangular wide portions that are larger in width than base end sides are respectively provided at tip portions of the first and second detection vibrating arms 421 and 422 and the first, second, third and fourth drive vibrating arms 441, 442, 443 and 444. By providing the weight sections 425, 426, 445, 446, 447 and 448, the detection sensitivity of the angular velocity of the gyro element 2 is enhanced.

The first and second drive vibrating arms 441 and 442 may extend from the middle of the first connecting arm 431 in the extension direction thereof. Similarly, the third and fourth drive vibrating arms 443 and 444 may extend from the middle of the second connecting arm 432 in the extension direction thereof.

Further, in this example, the first drive vibrating arm 441, the second drive vibrating arm 442, the third drive vibrating arm 443 and the fourth drive vibrating arm 444 extend from the first connecting arm 431 and the second connecting arm 432 that extend from the base portion 41, but the base portion 41, the first connecting arm 431 and the second connecting arm 432 may be integrally formed as a base portion. That is, the first driving arm, the second driving arm, the third driving arm and the fourth driving arm may extend from the base portion.

Further, the first and second support sections 51 and 52 extend along the x axis direction, respectively, and the vibrating body 4 is positioned between the first and second support sections 51 and 52. In other words, the first and second support sections 51 and 52 are arranged to face each other along the y axis direction through the vibrating body 4 axis. The first support body 51 is connected with the base portion 41 through the first beam 61 and the second beam 62, and the second support section 52 is connected with the base portion 41 through the third beam 63 and the fourth beam 64.

The first beam 61 passes between the first detection vibrating arm 421 and the first drive vibrating arm 441 to connect the first support section 51 with the base portion 41, the second beam 62 passes between the first detection vibrating arm 421 and the third drive vibrating arm 443 to connect the first support section 51 with the base portion 41, the third beam 63 passes between the second detection vibrating arm 422 and the second drive vibrating arm 442 to connect the second support section 52 with the base portion 41, and the fourth beam 64 passes between the second detection vibrating arm 422 and the fourth drive vibrating arm 444 to connect the second support section 52 with the base portion 41.

Each of the beams 61, 62, 63 and 64 has a meandering portion (S-shaped portion) that extends along the y axis direction while reciprocating along the x axis direction, and has elasticity in the x axis direction and the y axis direction. Further, since each of the beams 61, 62, 63 and 64 has an elongated shape having the meandering portion, the elasticity is provided in all directions. Thus, even if a shock is applied from the outside, each of the beams 61, 62, 63 and 64 has a function of absorbing the shock, and it is possible to reduce or suppress detection noise due to the shock.

Weight of Gyro Element

Mass adjustment detection arm weight layers 14 and 15 that adjust inherent resonance frequencies of the first detection vibrating arm 421 and the second detection vibrating arm 422 into desired frequencies are provided in the weight section 425 of the first detection vibrating arm 421 and the weight section 426 of the second detection vibrating arm 422.

A weight 13c is provided in the weight section 445 of the first drive vibrating arm 441. The weight 13c includes a first weight 12c that is provided in a first region of the first drive vibrating arm 441 that is spaced from the tip of the first drive vibrating arm 441 toward the side of the base portion 41, and a second weight 11c that is provided in a second region between the tip of the first drive vibrating arm 441 and an end of the first weight 12c on the tip side of the first drive vibrating arm 441 (hereinafter, referred to as a "tip of the first weight 12c").

The first region corresponds to a region of a quadrangular area A1 that is spaced from the tip of the first drive vibrating arm 441 (tip of the weight section 445) and both sides of the weight section 445. The first weight 12c is a quadrangle that is approximately overlaid with the first region, and has a mass B1. In FIG. 2, the first region is cross-hatched.

The second region corresponds to a region of an area A2 provided in the second region that is a region between the tip of the first weight 12c and the tip of the first drive vibrating arm 441 that faces the tip of the first weight 12c. The second weight 11c is a quadrangle in the second region that is narrower in width than that of the first weight 12c and extends from an approximately central part of the first weight 12c on the tip side of the first drive vibrating arm 441 in the width direction (x axis direction) to the tip of the first drive vibrating arm 441, and has a mass B2.

In this way, the weight 13c is formed in a convex form toward the tip side of the first drive vibrating arm 441. The weight 13c is provided so that the area A1 of the first region, the area A2 of the second region, the mass B1 of the first weight 12c and the mass B2 of the second weight 11c satisfy $B1/A1 > B2/A2$. In this example, since the first weight 12c and the second weight 11c are formed to have the same thickness, and in order to satisfy the above-mentioned relational expression, the first weight 12c is provided to have approximately the same shape as that of the first region, and the second weight 11c is provided so that the width of the second weight 11c is narrower than the width of the second region.

Similarly, a weight 13d is provided in the weight section 446 of the second drive vibrating arm 442. The weight 13d includes a first weight 12d that is provided in a first region of the second drive vibrating arm 442 that is spaced from the tip of the second drive vibrating arm 442 toward the side of the base portion 41, and a second weight 11d that is provided in a second region between the tip of the second drive vibrating arm 442 and an end of the first weight 12d on the tip side of the second drive vibrating arm 442 (hereinafter, referred to as a "tip of the first weight 12d").

The first region corresponds to a region of a quadrangular area A1 that is spaced from the tip of the second drive vibrating arm 442 (tip of the weight section 446) and both sides of the weight section 446. The first weight 12d is a quadrangle that is approximately overlaid with the first region, and has a mass B1.

The second region corresponds to a region of an area A2 provided in the second region that is a region between the tip of the first weight 12d and the tip of the second drive vibrating arm 442 that faces the tip of the first weight 12d. The second weight 11d is a quadrangle that is narrower in width than that of the first weight 12d and extends from an approximately central part of the first weight 12d on the tip side of the second drive vibrating arm 442 in the width direction (x axis direction) to the tip of the second drive vibrating arm 442 within the second region, and has a mass B2.

In this way, the weight 13d is formed in a convex form toward the tip side of the second drive vibrating arm 442. The weight 13d is provided so that the area A1 of the first region, the area A2 of the second region, the mass B1 of the first weight 12d and the mass B2 of the second weight 11d satisfy $B1/A1 > B2/A2$. In this example, since the first weight 12d and the second weight 11d are formed to have the same thickness, and in order to satisfy the above-mentioned relational expression, the first weight 12d is provided to have approximately the same shape as that of the first region, and the second weight 11d is provided so that the width of the second weight 11d is narrower than the width of the second region.

Similarly, a weight 13a is provided in the weight section 447 of the third drive vibrating arm 443. The weight 13a includes a first weight 12a that is provided in a first region of the third drive vibrating arm 443 that is spaced from the tip of the third drive vibrating arm 443 toward the side of the base portion 41, and a second weight 11a that is provided in a second region between the tip of the third drive vibrating arm 443 and an end of the first weight 12a on the tip side of the third drive vibrating arm 443 (hereinafter, referred to as a "tip of the first weight 12a").

The first region corresponds to a region of a quadrangular area A1 that is spaced from the tip of the third drive vibrating arm 443 (tip of the weight section 447) and both sides of the weight section 447. The first weight 12a is a quadrangle that is approximately overlaid with the first region, and has a mass B1.

The second region corresponds to a region of an area A2 provided in the second region that is a region between the tip of the first weight 12a and the tip of the third drive vibrating arm 443 that faces the tip of the first weight 12a. The second weight 11a is a quadrangle that is narrower in width than that of the first weight 12a and extends from an approximately central part of the first weight 12a on the tip side of the third drive vibrating arm 443 in the width direction (x axis direction) to the tip of the third drive vibrating arm 443 within the second region, and has a mass B2.

In this way, the weight 13a is formed in a convex form toward the tip side of the third drive vibrating arm 443. The weight 13a is provided so that the area A1 of the first region, the area A2 of the second region, the mass B1 of the first weight 12a and the mass B2 of the second weight 11a satisfy B1/A1>B2/A2. In this example, since the first weight 12a and the second weight 11a are formed to have the same thickness, and in order to satisfy the above-mentioned relational expression, the first weight 12a is provided to have approximately the same shape as that of the first region, and the second weight 11a is provided so that the width of the second weight 11a is narrower than the width of the second region.

Similarly, a weight 13b is provided in the weight section 448 of the fourth drive vibrating arm 444. The weight 13b includes a first weight 12b that is provided in a first region of the fourth drive vibrating arm 444 that is spaced from the tip of the fourth drive vibrating arm 444 toward the side of the base portion 41, and a second weight 11b that is provided in a second region between the tip of the fourth drive vibrating arm 444 and an end of the first weight 12b on the tip side of the fourth drive vibrating arm 444 (hereinafter, referred to as a "tip of the first weight 12b").

The first region corresponds to a region of a quadrangular area A1 that is spaced from the tip of the fourth drive vibrating arm 444 (tip of the weight section 448) and both sides of the weight section 448. The first weight 12b is a quadrangle that is approximately overlaid with the first region, and has a mass B1.

The second region corresponds to a region of an area A2 provided in the second region that is a region between the tip of the first weight 12b and the tip of the fourth drive vibrating arm 444 that faces the tip of the first weight 12b. The second weight 11b is a quadrangle that is narrower in width than that of the first weight 12b and extends from an approximately central part of the first weight 12b on the tip side of the fourth drive vibrating arm 444 in the width direction (x axis direction) to the tip of the fourth drive vibrating arm 444 within the second region, and has a mass B2.

In this way, the weight 13b is formed in a convex form toward the tip side of the fourth drive vibrating arm 444. The weight 13b is provided so that the area A1 of the first region, the area A2 of the second region, the mass B1 of the first weight 12b and the mass B2 of the second weight 11b satisfy B1/A1>B2/A2. In this example, since the first weight 12b and the second weight 11b are formed to have the same thickness, and in order to satisfy the above-mentioned relational expression, the first weight 12b is provided to have approximately the same shape as that of the first region, and the second weight 11b is provided so that the width of the second weight 11b is narrower than the width of the second region.

In this example, the weights 13a, 13b, 13c and 13d are provided on the tip sides of two pairs of drive vibrating arms that are the first drive vibrating arm 441 and the second drive vibrating arm 442, and the third drive vibrating arm 443 and the fourth drive vibrating arm 444, but the invention is not limited thereto. For example, the weights 13a, 13b, 13c and 13d may be provided in at least one of the first drive vibrating arm 441 and the second drive vibrating arm 442, and at least one of the third drive vibrating arm 443 and the fourth drive vibrating arm 444.

By providing the above-mentioned convex weights 13c, 13d, 13a and 13b in the weight section 445 of the first drive vibrating arm 441, the weight section 446 of the second drive vibrating arm 442, the weight section 447 of the third drive vibrating arm 443 and the weight section 448 of the fourth drive vibrating arm 444, it is possible to suppress temperature drift of the gyro element 2 generated as the weights 13c, 13d, 13a and 13b deviate in the y axis direction. Details thereof will be described later.

The gyro element 2 with such a configuration detects an angular velocity $\omega$ around the z axis as follows. In the gyro element 2, if an electric field is generated between the driving signal electrode (not shown) and the driving ground electrode (not shown) in a state where the angular velocity $\omega$ is not applied, each of the drive vibrating arms 441, 442, 443 and 444 performs flexural vibration in an arrow A direction, as shown in FIG. 3A. Here, the first and second drive vibrating arms 441 and 442 and the third and fourth drive vibrating arms 443 and 444 perform vibration in a plane-symmetrical manner with respect to the y-z plane passing through the central point G (center of gravity G), and thus, the base portion 41, the first and second connecting arms 431 and 432, and the first and second detection vibrating arms 421 and 422 are hardly vibrated.

In a state where the driving vibration is performed, if the angular velocity $\omega$ around the z axis is applied to the gyro element 2, vibration occurs as shown in FIG. 3B. That is, the Coriolis force in an arrow B direction acts on the drive vibrating arms 441, 442, 443 and 444 and the connecting arms 431 and 432. Detection vibration in an arrow C direction is excited according to the vibration in the arrow B direction. Further, distortion of the detection vibrating arms 421 and 422 generated due to the vibration is detected by the detection signal electrode (not shown) and the detection ground electrode (not shown) to calculate the angular velocity $\omega$.

Package

The package 9 accommodates the gyro element 2. An IC chip or the like such as an electronic device (to be described later) that drives the gyro element 2, in addition to the gyro element 2, may be accommodated in the package 9. The package 9 forms an approximately rectangular shape from the planar view (x-y planar view).

The package 9 includes a base 91 that has a concave portion that is opened on an upper surface thereof, and a lid (cover) 92 that is coupled with the base to cover an opening of the concave portion. Further, the base 91 includes a tabular bottom plate 911, and a frame-shaped side wall 912 provided in the periphery of an upper surface of the bottom plate 911. The package 9 has an accommodating space therein, and the gyro element 2 is air-tightly accommodated and installed in the accommodating space.

The gyro element 2 is fixed to the upper surface of the bottom plate 911 through a conductive fixing member 8 such as solder, silver paste or a conductive adhesive (adhesive in which conductive fillers such as metallic particles are dispersed in a resin material) using the first and second support sections 51 and 52. As the first and second support sections 51 and 52 that are positioned at the opposite end portions of the gyro element 2 in the y axis direction are fixed to the bottom plate 911, the vibrating body 4 of the gyro element 2 is supported at both ends, and thus, it is possible to stably fix the gyro element 2 to the bottom plate 911. Thus, unnecessary vibration (vibration other than detection vibration) of the gyro element 2 is suppressed, to thereby improve detection accuracy of the angular velocity ω due to the gyro element 2.

Further, six conductive fixing members 8 are separately provided corresponding to (being in contact with) two detection signal terminals 714, two detection ground terminals 724, a driving signal terminal 734 and a driving ground terminal 744 that are provided in the first and second support sections 51 and 52. Further, six connection pads 10 are provided on the upper surface of the bottom plate 911, corresponding to two detection signal terminals 714, two detection ground terminals 724, the driving signal terminal 734 and the driving ground terminal 744. Each of the connection pads 10 and any one terminal corresponding thereto are electrically connected to each other through the conductive fixing member 8.

Configuration of Weight

Figures 4A, 4B:
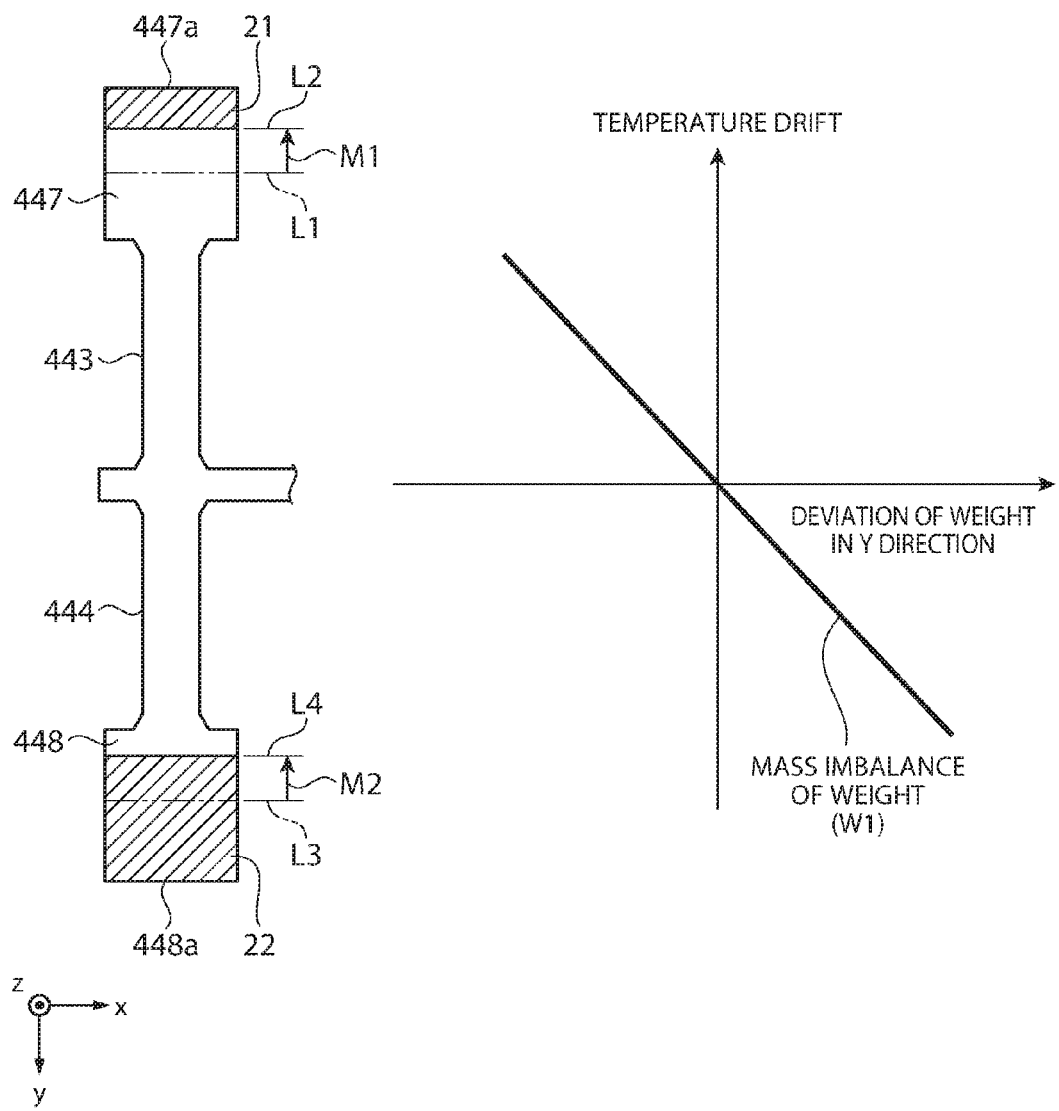

Next, configurations and effects of the weights 13c, 13d, 13a and 13b that are respectively provided in the first drive vibrating arm 441, the second drive vibrating arm 442, the third drive vibrating arm 443 and the fourth drive vibrating arm 444 will be described in detail referring to FIGS. 4A to 7C. For ease of description, the description will be made referring to the respective drawings including FIGS. 4A and 4B showing a configuration in the related art, using the third drive vibrating arm 443 and the fourth drive vibrating arm 444 according to the present embodiment. Further, since the first drive vibrating arm 441 and the second drive vibrating arm 442 have the same configuration, description thereof will not be made.

Figure 5A:
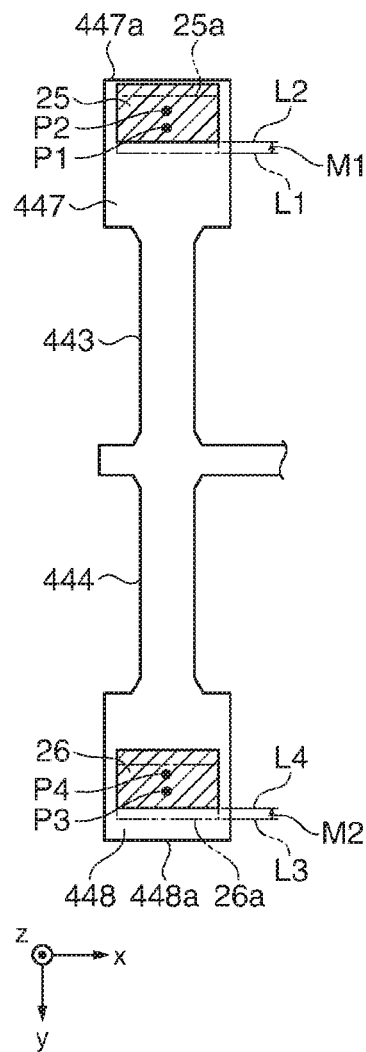
Figure 5B:
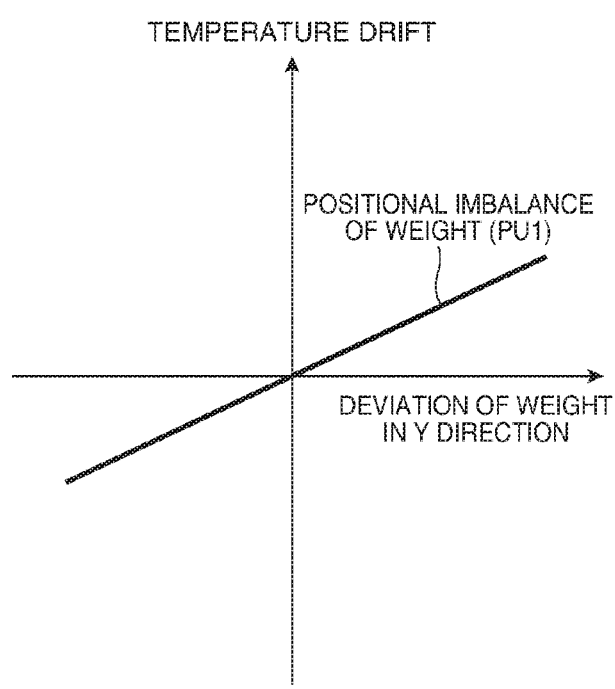
Figure 6A:
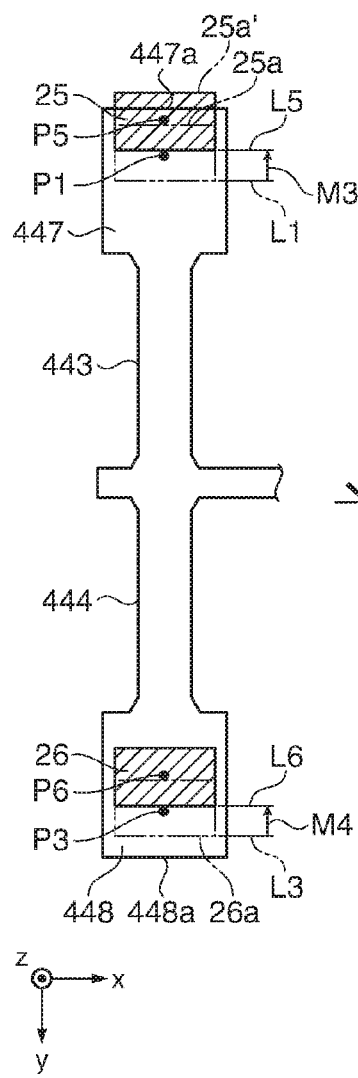
Figure 6B:
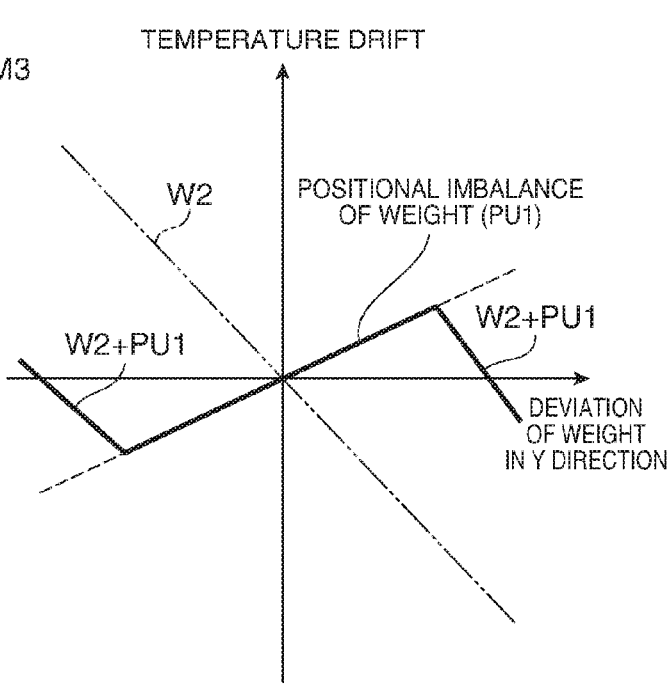

FIGS. 4A and 4B are diagrams illustrating the relationship between a weight and temperature drift of a gyro element in the related art, in which FIG. 4A is a partial plan view illustrating the shape of the weight, and FIG. 4B is a graph illustrating the correlation between the amount of deviation of the weight and the amount of temperature drift. FIGS. 5A and 5B are diagrams illustrating the relationship between a weight and temperature drift of a gyro element according to the present embodiment, in which FIG. 5A is a partial plan view illustrating the shape of the weight, and FIG. 5B is a graph illustrating the correlation between the amount of deviation of the weight and the amount of temperature drift. FIGS. 6A and 6B are diagrams illustrating the relationship between a weight and temperature drift of a gyro element according to the present embodiment, in which FIG. 6A is a partial plan view illustrating the shape of the weight, and FIG. 6B is a graph illustrating the correlation between the amount of deviation of the weight and the amount of temperature drift. FIGS. 7A to 7C are diagrams illustrating the relationship between a weight and temperature drift of a gyro element according to the present embodiment, in which FIG. 7A is a partial plan view illustrating the shape of the weight, FIG. 7B is a graph illustrating the correlation between the amount of deviation of the weight and the amount of temperature drift, and FIG. 7C is an enlarged plan view illustrating details of the shape of the weight.

Here, the amount of temperature drift refers to frequency variation of a gyro element depending on a temperature change.

Weight in Related Art Configuration

First, the relationship between a weight in the related art and temperature drift of a gyro element (hereinafter, referred to as "temperature drift") will be described referring to FIGS. 4A and 4B. As shown in FIG. 4A, a weight 21 is provided in the weight section 447 of the third drive vibrating arm 443, and a weight 22 is provided in the weight section 448 of the fourth drive vibrating arm 444. The weight 21 and the weight 22 are provided from positions L1 and L3 indicated by two-dotted lines in the figure to respective tips 447a and 448a of the weight sections 447 and 448 so that masses and positions thereof are the same.

However, in a case where an installation position of a deposition mask when the weight 21 and the weight 22 are formed deviates in the extension direction of the third drive vibrating arm 443 and the fourth drive vibrating arms 444, positions where the weight 21 and the weight 22 are formed deviate as indicated by hatched lines in the figure. Since the deposition mask is integrally formed so as to correspond to multiple weights of multiple gyro elements 2, if an installation position thereof deviates, the pair of weights 21 and 22 deviate in the same direction with the same amount of deviation.

In this example, positional deviation of deviations M1 and M2 (M1 and M2 are the same) occurs in the −y axis direction. In the weight 21, an end of the third drive vibrating arm 443 on the root side thereof is positioned at a position of L2, and in the weight 22, an end of the fourth drive vibrating arm 444 on the root side thereof is positioned at a position of L4.

In this way, as the formation positions of the weights 21 and 22 deviate, the masses of the weights 21 and 22 are changed. Thus, the mass balance of the weights 21 and 22 that are formed in the pair of third drive vibrating arm 443 and fourth drive vibrating arm 444 is broken, and thus, temperature drift occurs in the gyro element 2 due to the mass imbalance.

Next, the correlation between the amount of deviation of the weights 21 and 22 and temperature drift will be described referring to the graph in FIG. 4B.

In the related art example, as the mass imbalance of the weights 21 and 22 is large (increases), in other words, as the deviation of the installation position of the deposition mask in the y axis direction is large (increases), the temperature drift is large (increases). In the deviation of the deposition mask in this example, the smaller the weight 21 is, the larger the weight 22 is, but if the deposition mask deviates in the opposite direction, the weight 21 gradually becomes larger, and the weight 22 becomes smaller. As the mass imbalance is increased in this way, the correlation between the deviation of the weights 21 and 22 and the temperature drift forms an approximate line W1 having a negative inclination, as shown in FIG. 4B.

Particularly, since the shapes of the weights 21 and 22 in the related art extend up to the tips 447a and 448a of the weight sections 447 and 448, respectively, if the installation position of the deposition mask deviates in the y axis direction, the mass of the weight 21 is decreased and the mass of the weight 22 is increased. In such a configuration, since the deviation is directly expressed as a mass change, the influence of mass imbalance is increased, and thus, the inclination of the approximate line W1 in the figure is increased. That is, the deviation of the deposition mask greatly affects the temperature drift.

Example 1 of Weight

Next, the relationship between Example 1 of a weight and temperature drift of a gyro element (hereinafter, referred to as temperature drift) will be described referring to FIGS. 5A and 5B and FIGS. 6A and 6B. FIG. 5A is a partial plan view illustrating a state where a weight deviates inside a weight section, and FIG. 5B is a graph illustrating the correlation between the amount of deviation of the weight and the amount of temperature drift. FIG. 6A is a partial plan view illustrating a state where one weight deviates to go outside a weight section, and FIG. 6B is a graph illustrating the correlation between the amount of deviation of the weight and the amount of temperature drift.

As shown in FIG. 5A, a weight 25 is provided in the weight section 447 of the third drive vibrating arm 443, and a weight 26 is provided in the weight section 448 of the fourth drive vibrating arm 444. The weights 25 and 26 are originally provided inside the weight sections 447 and 448 in the form of rectangular shapes 25a and 26a indicated by two-dotted lines in the figure (having a gap with respect to each of tips 447a and 448a and both sides) so that masses and positions thereof are the same.

However, if an installation position of a deposition mask where the weights 25 and 26 are formed deviates by the deviations M1 and M2 in the −y axis direction, the weights 25 and 26 deviate inside (within the planes of) the weight sections 447 and 448. In other words, the weights 25 and 26 deviate to the degree that the weights 25 and 26 do not go outside the weight section 447 and 448. In this case, the weights 25 and 26 are formed at positions indicated by hatched lines in the figure, and cause positional deviation of the deviations M1 and M2 (M1 and M2 are the same) in the −y axis direction. In the weight 25, the end of the third drive vibrating arm 443 on the root side thereof is changed in position from L1 to L2, and in the weight 26, the end of the fourth drive vibrating arm 444 on the side of the tip 448a is changed in position from L3 to L4.

Since the deposition mask is integrally formed to correspond to the weights 25 and 26 of multiple gyro elements 2, if the installation position deviates, the pair of weights 25 and 26 deviates in the same direction with the same amount of deviation. Accordingly, the center of gravity P1 of the weight 25 moves to the center of gravity P2, and the center of gravity P3 of the weight 26 moves to the center of gravity P4.

In this way, as the formation positions of the weights 25 and 26 deviate inside the weight sections 447 and 448, the weights 25 and 26 are changed in positional (center of gravity) balance without a change in the mass balance.

However, if the positions of the weights 25 and 26 are close to the tips 447a and 448a of the third drive vibrating arm 443 and the fourth drive vibrating arm 444, the influence on the temperature drift is increased. Thus, the weight 25 of which the center of gravity moves to the side of the tip 447a is in a state of pseudo mass increase, and the weight 26 of which the center of gravity moves to the root side is in a state of pseudo mass decrease.

Thus, according to this configuration in which the formation positions of the weights 25 and 26 deviate inside the weight sections 447 and 448, it is possible to reduce the influence on the temperature drift compared with the influence due to mass unevenness in the related art example.

In order to reduce the influence on the temperature drift due to the change in balance of the center of gravity with respect to the formation positions of the weights 25 and 26, it is preferable to set intervals between the tips 447a and 448a of the weight sections 447 and 448 and the weights 25 and 26 to be equal to or larger than the sizes of the weights 25 and 26 in the y axis direction. This is effective for reducing the influence due to the mass unevenness generated as the weights 25 and 26 move close to the tips 447a and 448a of the weight sections 447 and 448.

The correlation between the deviation of the weights 25 and 26 inside the weight sections 447 and 448 and temperature drift will be described referring to the graph in FIG. 5B.

In the above-described example, the weights 25 and 26 deviate in the −y axis direction. The weight 25 deviates to the side of the tip 447a of the weight section 447, and the weight 26 deviates to the root side of the fourth drive vibrating arm 444. As described above, the weight 25 that deviates to the side of the tip 447a of the weight section 447 is in a state of pseudo mass increase, the mass change becomes opposite, compared with the above-described related art example. Accordingly, as shown in FIG. 5B, the inclination of an approximate line PU1 becomes positive (opposite to the related art example). Further, since the mass change does not directly occur, it is possible to reduce the inclination (absolute value). In other words, it is possible to reduce the influence on the temperature drift.

Next, a case where the formation of the weight in Example 1 described referring to FIGS. 5A and 5B further deviates to go outside the weight section 447 or 448 will be described referring to FIGS. 6A and 6B. Here, the same description as the above-described description using FIG. 5 is omitted.

As shown in FIG. 6A, the weight 25 is formed in the state of going outside the tip 447a of the weight section 447. In this case, the weights 25 and 26 cause positional deviation of deviations M3 and M4 (M3 and M4 are the same), in the −y axis direction, from the rectangular shapes 25a and 26a that are the original positions, indicated by two-dotted lines in the figure. The weight 25 is changed in position from L1 to L5 at an end thereof on the root side of the third drive vibrating arm 443, and is disposed in a position 25a' (indicated by two-dotted line) that is outside the weight section 447 at an end thereof on the side of the tip 447a of the weight section 447. That is, a part of the weight 25 on the side of the tip 447a is not formed, and thus, the surface area of the weight 25 is decreased. The weight 26 is changed in position from L3 to L6 at an end thereof on the side of the tip 448a of the fourth drive vibrating arm 444. Further, the center of gravity P1 of the weight 25 moves to the center of gravity P5, and the center of gravity P3 of the weight 26 moves to the center of gravity P6.

In this way, if the weight 25 goes outside the tip 447a of the weight section 447, the above-described influence on the temperature drift due to the mass imbalance of mass change in the related art example results. This will be described referring to FIG. 6B. Here, since a case where the weight 25 goes outside the tip 447a of the weight section 447 will be described, the description will be made in the left region with reference to the longitudinal axis in FIG. 6B.

In a case where the weight 25 is inside the weight section 447, the influence is applied along the approximate line PU1 having the positive inclination as described above, but the correlation with the mass imbalance due to mass change is added with reference to an inflection point where the weight 25 goes outside the weight section 447. In other words, in a left region with reference to the inflection point, that is, in a case where the weight 25 goes outside the weight section 447, the correlation of an approximate line (W2+PU1) having an inclination obtained by adding an approximate line W2 having a negative inclination that shows the correlation between mass imbalance and temperature drift due to mass change and the approximate line PU1 having the positive inclination that shows the correlation between positional imbalance and temperature drift due to change in positional (center of gravity) balance is obtained.

In this way, in the weights 25 and 26 of Example 1, in a case where deviation of the installation position of the deposition mask occurs, it is possible to suppress the occurrence of temperature drift due to the positional deviation of the weights 25 and 26. That is, it is possible to reduce the correlation between the positional deviation of the weights 25 and 26 and the temperature drift.

Example 2 of Weight

Next, the relationship between Example 2 of a weight and temperature drift will be described referring to FIGS. 7A to 7C. FIG. 7A is a partial plan view illustrating a state where a weight deviates inside a weight section, FIG. 7B is a graph illustrating the correlation between the amount of deviation of the weight and the amount of temperature drift, and FIG. 7C is an enlarged plan view illustrating details of the shape of the weight.

Weights 13a and 13b of the present example are formed to have the configuration that is described in detail in the above-described embodiment (the weight of the gyro element). Briefly, the weights 13a and 13b include first weights 12a and 12b, and second weights 11a and 11b that have a mass per unit area that is smaller than that of the first weights 12a and 12b. Hereinafter, description will be made using the weight 13b provided in the fourth drive vibrating arm 444. Further, a first region represents an entire region where the first weight 12b is provided. Further, a boundary line between the first region and the second region is a boundary where the shape, mass, material, thickness or the like of the weight 13b is changed, and corresponds to a tip of the first weight 12b (a side thereof on the tip side of the fourth drive vibrating element 444).

The weight 13b includes the first weight 12b that is provided in the first region of the fourth drive vibrating arm 444 that is spaced from the tip of the fourth drive vibrating arm 444 toward the side of the base portion 41, and the second weight 11b that is provided in the second region between the tip of the fourth drive vibrating arm 444 and the tip of the first weight 12b.

As described above, the first region corresponds to the region of the area A1, and the first weight 12b is a quadrangle that is approximately overlaid with the first region and has the mass B1. Further, the second region corresponds to the region of the area A2, and the second weight 11b is a quadrangle that is narrower in width than that of the first weight 12b within the second region and has the mass B2. That is, the weight 13b is formed in a convex form toward the tip side of the fourth drive vibrating arm 444.

The weight 13b is provided so that the area A1 of the first region, the area A2 of the second region, the mass B1 of the first weight 12b and the mass B2 of the second weight 11b satisfy B1/A1>B2/A2. In this example, since the first weight 12b and the second weight 11b are formed to have the same thickness, and in order to satisfy the above-mentioned relational expression, the first weight 12b is provided to have approximately the same shape as that of the first region, and the second weight 11b is provided so that the width of the second weight 11b is narrower than the width of the second region.

Typically, it is preferable that the weights 13a and 13b have symmetric shapes and the same masses and positions, like weights 13a' and 13b' indicated by two-dotted lines in the figure. However, in a similar way to the above-described Example 1, in a case where the installation position of the deposition mask that forms the weights 13a and 13b deviates by deviations M5 and M6 in the −y axis direction, the weights 13a and the weight 13b deviate inside the weight sections 447 and 448 (within the planar region). FIG. 7A shows a case where the weights 13a and 13b deviate to a degree that the weights 13a and 13b do not go outside the weight sections 447 and 448. In this case, the weights 13a and 13b are formed at positions indicated by hatched lines in the figure, and cause positional deviation of the deviations M5 and M6 (M5 and M6 are the same) in the −y axis direction.

The weight 13a moves to the position of L2 that is deviated by the deviation M5 from the original position L1 at an end thereof on the root side of the third drive vibrating arm 443, and the weight 13b moves to the position of L4 that is deviated by the deviation M6 from the original position L3 at an end thereof on the root side of the fourth drive vibrating arm 444.

Since the deposition mask is integrally formed to correspond to the weights 13a and 13b of multiple gyro elements 2, if the installation position deviates, the pair of weights 13a and 13b deviates in the same direction with the same deviation. The center of gravity P1 of the weight 13a moves to the center of gravity P2, and the center of gravity P3 of the weight section 26 moves to the center of gravity P4. Further, in a case where the deposition mask greatly deviates in the −y axis direction, only the first weight 12a is formed in the weight section 447, and the first weight 12b and the second weight 11b are formed in the weight section 448.

In this way, as the formation positions of the weights 13a and 13b deviate inside (within the planes of) the weight sections 447 and 448, the weights 13a and 13b are changed in the mass balance and positional (center of gravity) balance.

As the positional (center of gravity) balance is changed, the first weight 12a of which the center of gravity moves toward the tip 447a is in a state of pseudo mass increase, and the first weight 12b of which the center of gravity moves toward the root side is in a state of pseudo mass decrease. In Example 2, due to the second weights 11a and 11b having a mass per unit area that is smaller than that of the first weights 12a and 12b, the pseudo mass imbalance is offset and the influence on the temperature drift is reduced.

In the configuration of Example 2, the reduction of the influence on the temperature drift will be described referring to FIGS. 7B and 7C. In FIG. 7C, the weight 13b is used as a representative example.

The weight 13b of Example 2 includes the first weight 12b that is formed in a rectangular shape of width S× length T, and the second weight 11b that is formed in a rectangular shape of width S/3× length 2T.

The first weight 12b is spaced from the tip 448a of the fourth drive vibrating arm 444 toward the side of the base portion 41, and is provided within the plane (first region indicated by cross-hatched lines in the figure) of the weight section 448. The second weight 11b is provided in the second region that is the region between the tip 448a of the fourth drive vibrating arm 444 and the tip of the first weight 12b. The second region corresponds to a region indicated by a broken line (dashed line) in the figure, which is a region where the width of the tip of the first weight 12b in the x axis direction extends to the tip 448a of the fourth drive vibrating arm 444. Here, since the second weight 11b is provided with the width (S/3) of ⅓ of the width S of the second region, the mass per unit area is formed to be small, compared with the first weight 12b formed in the rectangular shape of width S× length T that is approximately the same area as that of the first region. That is, the weight section 13b is provided so that the area A1 of the first region, the area A2 of the second region, the mass B1 of the first weight 12b and the mass B2 of the second weight 11b satisfy B1/A1>B2/A2.

In the configuration of Example 2 having the above-described weight layers, in a case where the formation position of the weight 13b deviates in the −y axis direction, the second weight 11b provided at the position close to the tip 448a forms the correlation between mass imbalance of the weight and temperature drift, and the first weight 12b provided at the position separated from the tip 448a forms the correlation between positional imbalance of the weight and temperature drift.

In the weight 13b of Example 2, since the mass per unit area of the second weight 11b at the position close to the tip 448a is configured to be small, it is possible to further reduce the influence on the mass imbalance of the weight and temperature drift, compared with Example 1. That is, it is possible to reduce the inclination of an approximate line W3, shown in FIG. 7B, indicating the influence on the mass imbalance of the weight and temperature drift, compared with the inclination of the approximate line W2 shown in FIG. 6B.

Further, although the first weight 12b forms the correlation with the positional imbalance of the weight, since the first weight 12b is provided at the position (spaced) separated from the tip 448a by the distance at which the second weight 11b is provided, it is possible to reduce the influence on the positional imbalance of the weight and temperature drift, compared with Example 1. That is, it is possible to reduce the inclination of an approximate line PU2, shown in FIG. 7B, indicating the influence on the positional imbalance of the weight and temperature drift, compared with the inclination of the approximate line PU1 shown in FIG. 6B.

Further, since the inclination of the approximate line W3 indicating the influence on the mass imbalance of the weight and temperature drift and the inclination of the approximate line PU2 indicating the influence on the positional imbalance of the weight and temperature drift are approximately the same in positive and negative values, the respective influences are canceled. By adding two approximate lines W3 and PU2, it is possible to obtain an approximate line W3+PU2 almost without the influence on the temperature drift. That is, by using the weight 13b having the first weight 12b and the second weight 11b, even though the formation position of the weight 13b deviates in the −y axis direction due to deviation or the like of the installation position of the deposition mask, it is possible to minimize the influence on the temperature drift.

Further, as described above, by setting the width of the second weight 11b to ⅓ of the width of the first weight 12b, and by reducing the mass per unit area of the second weight 11b compared with the mass per unit area of the first weight 12b, it is possible to set the absolute values of the inclination of the approximate line W3 and the inclination of the approximate line PU2 to be approximately the same, and thus, it is possible to achieve a simulation result that the approximate line is approximately overlaid with the transverse axis.

Further, as shown in FIG. 7A, the second weight 11b provided in the fourth drive vibrating arm 444 has a mass larger than that of the second weight 11a provided in the third drive vibrating arm 443. Thus, the influence on the temperature drift due to the positional imbalance of the first weights 12a and 12b and the influence on the temperature drift due to the mass imbalance of the second weights 11a and 11b are offset, and thus, the temperature drift is reduced as a whole.

Modification Example of Weight

In the above-mentioned weights 13a and 13b, the convex shape is illustrated as an example, but with any configuration in which the mass per unit area of the second weight is smaller than the mass per unit area of the first weight, the same effect is achieved. Representative modification examples of a weight will be described referring to FIGS. 8A to 8E. FIGS. 8A to 8E are enlarged plan views illustrating details of the shape of the weight in the modification examples. In this description, a point corresponding to the weight 13b provided in the fourth drive vibrating arm 444 is used for description, but this may be applied to the other weights. Further, the first region represents an entire region where the first weight 12b is provided. Further, a boundary line between the first region and the second region is a boundary where the shape, mass, material, thickness or the like of the weight 13b is changed, and corresponds to a tip of the first weight 12b (a side thereof on the tip side of the fourth drive vibrating element 444).

Figure 8A:
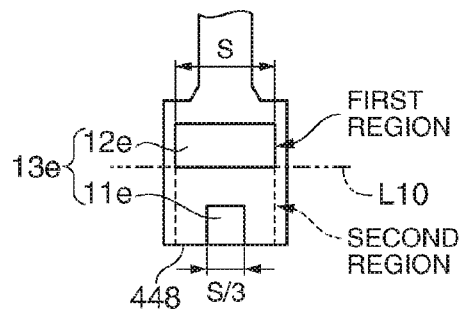
FIGS. 8A to 8E are partial plan views illustrating modification examples of a weight.

A weight 13e of a modification example shown in FIG. 8A includes a first weight 12e and a second weight 11e having a mass per unit area that is smaller than that of the first weight 12e, and is formed in the weight section 448. The first weight 12e is provided in a rectangular shape at a position spaced from the tip of the weight section 448. The second weight 11e is provided in a rectangular shape on the tip side of the weight section 448 between the tip of the weight section 448 and the first weight 12e. The second weight 11e has a small mass as the size thereof in the width direction (x-axis direction in the embodiment) of the weight section 448 is reduced. A boundary line L10 in the figure represents a boundary between the first region and the second region.

Figure 8B:
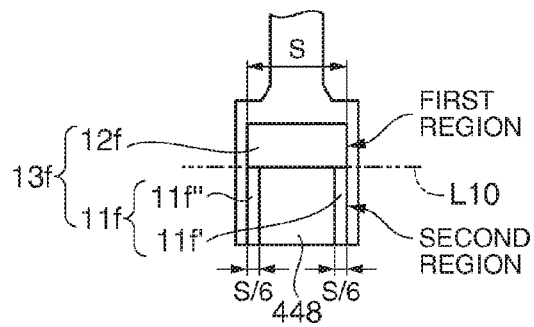

A weight 13f of a modification example shown in FIG. 8B includes a first weight 12f and a second weight 11f having a mass per unit area that is smaller than that of the first weight 12f, and is formed in the weight section 448. The first weight 12f is provided in a rectangular shape at a position spaced from the tip of the weight section 448. The second weight 11f has two third weights 11f' and 11f'' that protrude from opposite ends of the first weight 12f in the width direction (x-axis direction in the embodiment) toward the tip of the weight section 448, between the tip of the weight section 448 and the first weight 12f. The second weight 11f has a small mass as the size thereof in the width direction (x-axis direction in the embodiment) of the weight section 448 is reduced when two third weights 11f' and 11f'' are added. The boundary line L10 in the figure represents the boundary between the first region and the second region.

Figure 8C:
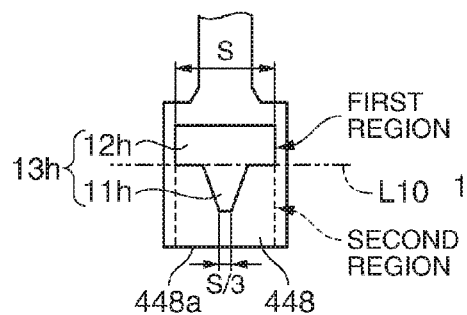

A weight 13h of a modification example shown in FIG. 8C includes a first weight 12h and a second weight 11h having a mass per unit area that is smaller than that of the first weight 12h, and is formed in the weight section 448. The first weight 12h is provided in a rectangular shape at a position spaced from the tip of the weight section 448. The second weight 11h extends from the first weight 12h between the tip of the weight section 448 and the first weight 12h, and is provided in a shape that its width is reduced (converges) toward the tip of the weight section 448. The second weight 11h has a small mass as the size thereof in the width direction (x-axis direction in the embodiment) of the weight section 448 is reduced. The boundary line L10 in the figure represents the boundary between the first region and the second region.

Figure 8D:
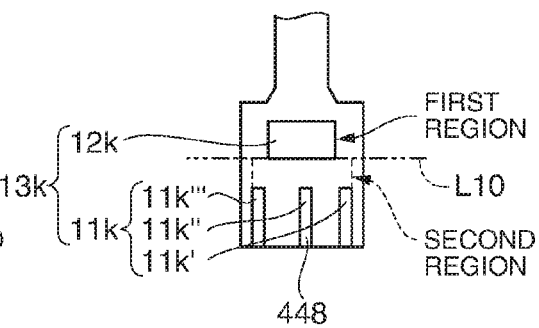

A weight 13k of a modification example shown in FIG. 8D includes a first weight 12k and a second weight 11k having a mass per unit area that is smaller than that of the first weight 12k, and is formed in the weight section 448. The first weight 12k is provided in a rectangular shape at a position spaced from the tip of the weight section 448. The second weight 11k include three thin rectangular third weights 11k', 11k", and 11k''' that are provided between the tip of the weight section 448 and the first weight 12k, have a small interval from the first weight 12k, and extend toward the tip of the weight section 448. The second weight 11k has a small mass as the size thereof in the width direction (x-axis direction in the embodiment) of the weight section 448 is reduced when three third weights 11k', 11k", and 11k''' are added. The boundary line L10 in the figure represents the boundary between the first region and the second region.

Figure 8E:
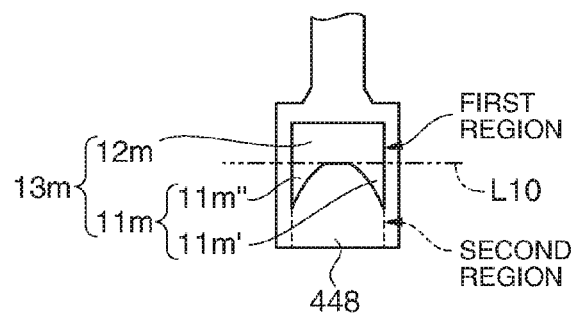

A weight 13m of a modification example shown in FIG. 8E includes a first weight 12m and a second weight 11m having a mass per unit area that is smaller than that of the first weight 12m, and is formed in the weight section 448. The first weight 12m is provided in a rectangular shape at a position spaced from the tip of the weight section 448. The second weight 11m includes two protrusions (third weights) 11m' and 11m" that are provided between the tip of the weight section 448 and the first weight 12m, form an r-shaped inner side (the inner sides are curved, arcuate or rounded, and protrude from opposite ends of the first weight 12m in the width direction (x-axis direction in the embodiment) toward the tip of the weight section 448. The second weight 11m has a small mass as the size thereof in the width direction (x-axis direction in the embodiment) of the weight section 448 is reduced when two protrusions (third weights) 11m' and 11m" are added. In this way, a configuration in which a curve is formed in the appearance of the weight 13m may be used. The boundary line L10 in the figure represents the boundary between the first region and the second region.

In the above-described modification examples, several examples in which the second weight is divided in plural are described, but contrarily, a configuration in which the first weight is divided in plural may be used.

Further, since it is sufficient if the mass per unit area of the second weight is smaller than that of the first weight, for example, the following configurations may be used.

(1) A second weight is formed to have the same thickness as that of a first weight, and has a width size narrower than that of the first weight in the x-axis direction.

Figure 9A:
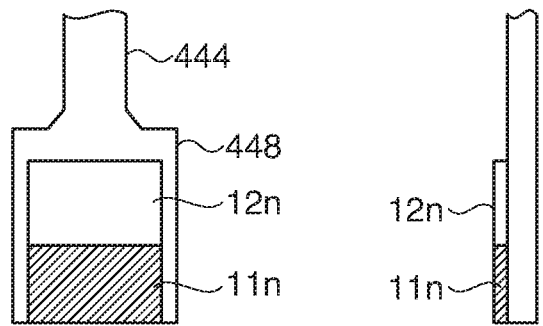
FIGS. 9A to 9C are plan views and sectional views illustrating modification examples of a weight.

(2) As shown in FIG. 9A, a second weight 11n is formed to have the same thickness and width as those of a first weight 12n, and is formed of a material having a specific gravity smaller than that of the first weight 12n (portion indicated by hatched lines).

Figure 9B:
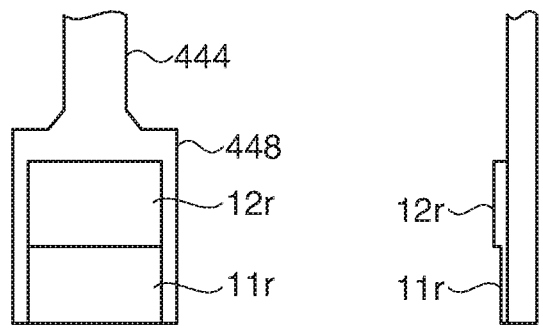

(3) As shown in FIG. 9B, a second weight 11r is formed to have the same shape as that of a first weight 12r, and is formed to have a thickness smaller than that of the first weight 12r.

Figure 9C:
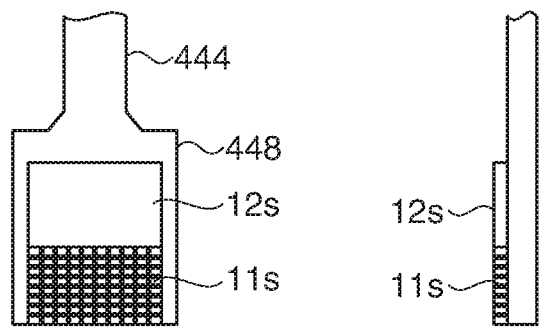

(4) As shown in FIG. 9C, a second weight 11s is formed to have the same shape as that of a first weight 12s, and a mesh (reticular and/or perforated) shape.

Even in the weights having the configurations of the above-described modification examples, the same effects as those of the weights having the configurations of the embodiments (Examples of the weight) are achieved.

Method of Manufacturing Gyro Element

Figure 10:
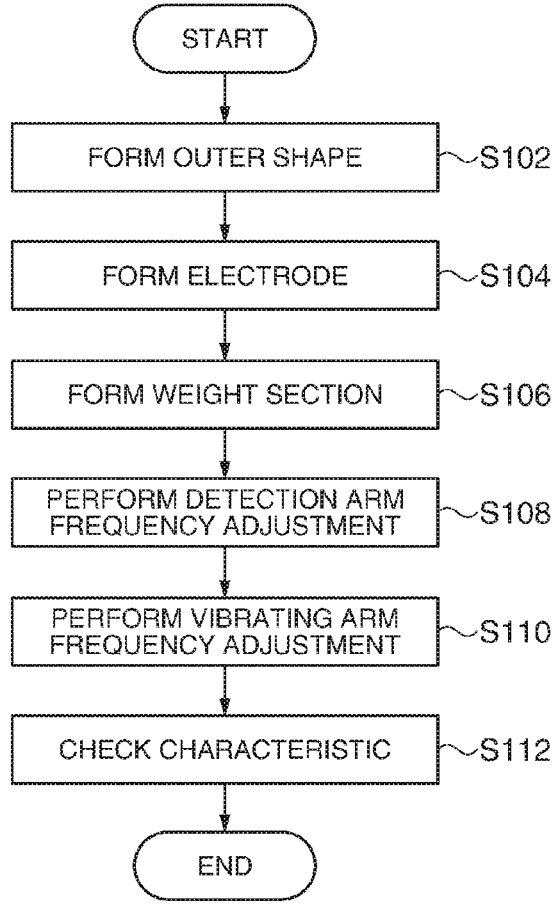
FIG. 10 is a flowchart illustrating a method for manufacturing a vibrator element according to an embodiment of the invention.

Next, a method of manufacturing a gyro element according to an embodiment of the invention will be described referring to the accompanying drawings. FIG. 10 is a flowchart illustrating schematic manufacturing processes of the gyro element 2 that is the vibrator element shown in FIG. 2.

First, a substrate such as a quartz plate is prepared. Further, outer shapes of the first, second, third and fourth drive vibrating arms 441, 442, 443 and 444, the first and second detection vibrating arms 421 and 422, and the like shown in FIG. 2 are formed by using a photolithography method or the like with respect to the substrate, to form a gyro element raw glass (step S102).

Then, an electrode film is formed on the surface of the gyro element raw glass (step S104). The electrode film has a configuration in which a base metal layer of Cr or the like is formed to improve adhesiveness to the quartz and an Au layer is formed on a front surface thereof, for example. The electrode film may be formed using a deposition method, a sputtering method or the like.

Then, as shown in FIG. 2, the detection arm weight layers 14 and 15 are formed in the weight sections 425 and 426 of the tip portions of the first and second detection vibrating arms 421 and 422, and the weights 13a, 13b, 13c and 13d are formed in the weight sections 445, 446, 447 and 448 of the tip portions of the first, second, third and fourth drive vibrating arms 441, 442, 443 and 444 (step S106).

Here, the weights 13a, 13b, 13c and 13d include the first weights 12a, 12b, 12c and 12d that are spaced from the tips of the first, second, third and fourth drive vibrating arms 441, 442, 443 and 444, and the second weights 11a, 11b, 11c and 11d that are provided between the tips of the first, second, third and fourth drive vibrating arms 441, 442, 443 and 444 and the first weights 12a, 12b, 12c and 12d and have a mass per unit area that is smaller than that of the first weight 12a.

A process of forming the first weights 12a, 12b, 12c and 12d and a process of forming the second weights 11a, 11b, 11c and 11d may be different from each other. As the formation of the first weights 12a, 12b, 12c and 12d and the formation of the second weights 11a, 11b, 11c and 11d are made by different processes, it is possible to cope with the different materials, different thicknesses, any mesh shape, or the like of the first weights 12a, 12b, 12c and 12d and the second weights 11a, 11b, 11c and 11d.

The detection arm weight layers 14 and 15 and the weights 13a, 13b, 13c and 13d have a configuration in which a metal layer of Au or the like is formed by a deposition method, a sputtering method or the like using a metal mask or the like, and the thickness of the layer is formed to be thicker than the electrode film.

Then, a mass adjustment of the first and second detection vibrating arms 421 and 422 is performed, and inherent resonance frequencies of the first and second detection vibrating arms 421 and 422 are adjusted into desired frequencies (step S108). The mass adjustment is performed for adjustment of detuning frequencies, and for example, is performed by melting and evaporating at least apart of the detection arm weight layers 14 and 15 formed in the first and second detection vibrating arms 421 and 422 to be removed by irradiation of a converged laser beam. If necessary, the electrode film may be melted and evaporated to be removed. Further, the masses of the detection arm weight layers 14 and 15 may be increased.

Then, the mass adjustment of the first, second, third and fourth drive vibrating arms 441, 442, 443 and 444 is performed, and inherent resonance frequencies of the first, second, third and fourth drive vibrating arms 441, 442, 443 and 444 are adjusted into desired frequencies, to perform a vibrating arm frequency adjustment (step S110). Further, the mass adjustment has a function of preventing a so-called vibration leakage in which flexural vibrations of the first, second, third and fourth drive vibrating arms 441, 442, 443 and 444 propagate to the first and second detection vibrating arms 421 and 422 through the first connecting arm 431 and the second connecting arm 432.

The vibrating arm frequency adjustment changes the inherent resonance frequencies of the respective first, second, third and fourth drive vibrating arms 441, 442, 443 and 444, and adjusts the inherent resonance frequencies of the respective first, second, third and fourth drive vibrating arms 441, 442, 443 and 444 to match with each other. The vibrating arm frequency adjustment (mass adjustment) is performed by melting and evaporating at least a part of the weights 13a, 13b, 13c and 13d formed in the first, second, third and fourth drive vibrating arms 441, 442, 443 and 444 to be removed by irradiation of a converged laser beam, for example. Further, the masses of the weights 13a, 13b, 13c and 13d may be increased.

The vibrating arm frequency adjustment is performed by a so-called coarse adjustment of roughly adjusting inherent resonance frequencies and a so-called fine adjustment of adjusting inherent resonance frequencies according to fine mass adjustment.

Further, the vibrating arm frequency adjustment may be performed by removing at least either the first weights 12a, 12b, 12c, and 12d or the second weights 11a, 11b, 11c and 11d that form the weights 13a, 13b, 13c, and 13d. Further, the masses of at least either the first weights 12a, 12b, 12c, and 12d or the second weights 11a, 11b, 11c and 11d that form the weights 13a, 13b, 13c, and 13d may be increased.

Then, an electric characteristic of the gyro element is checked and the gyro element 2 having a desired characteristic is selected, to thereby complete the gyro element 2 (step S112).

According to the above-described manufacturing method of the gyro element 2 that is the vibrator element, the detection arm weight layers 14 and 15 and the weights 13a, 13b, 13c and 13d may be formed by the same process. Further, since the first weights 12a, 12b, 12c, and 12d and the second weights 11a, 11b, 11c and 11d that form the weights 13a, 13b, 13c and 13d may also be formed by the same process, it is possible to manufacture the gyro element 2 with high efficiency.

In the above description, the gyro sensor using the so-called double T-shaped gyro element is illustrated as an example of the element, but the element according to the embodiments of the invention is not limited to the double T-shaped gyro element. Any element having vibrating arms that extend in opposite directions from a base portion may be used. As the element according to the embodiments of the invention, for example, a so-called H-shaped gyro element, a vibrator element having tuning fork type vibrating arms that extend in opposite directions from a base portion, or the like may be used.

Electronic Device

Figure 11:
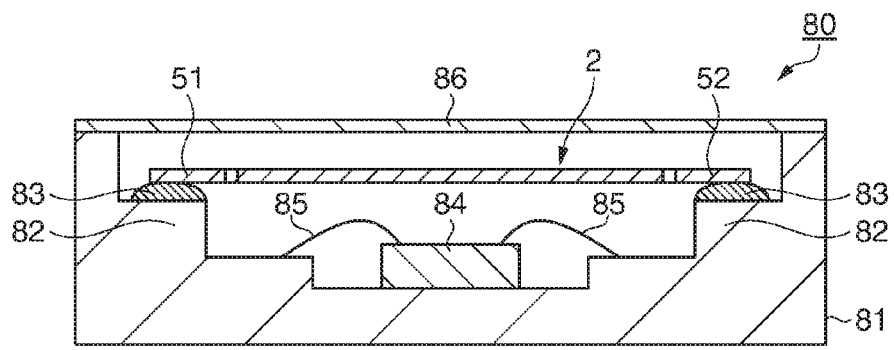
FIG. 11 is a front sectional view illustrating an electronic device using a vibrator element according to an embodiment of the invention.

Next, a gyro sensor that is an example of an electronic device that uses the gyro element 2 will be described referring to FIG. 11. FIG. 11 is a front sectional view schematically illustrating a gyro sensor.

A gyro sensor 80 includes a gyro element 2 that is a vibrator element, an IC 84 that is a circuit element, and a container 81 that is a package, and a cover 86. The IC 84 is disposed on a bottom surface of the container 81 made of ceramics or the like, and is electrically connected with a wiring (not shown) formed in the container 81 by a wire 85 of Au or the like. The IC 84 includes a drive circuit for driving and vibrating the gyro element 2, and a detection circuit that detects detection vibration generated in the gyro element 2 when an angular velocity is applied.

The gyro element 2 is adhered and supported to a support 82 formed in the container 81 through a fixing member 83 such as a conductive adhesive at support portions 51 and 52 of the gyro element 2. Further, a wiring (not shown) is formed on the surface of the support 82, and conduction between an electrode of the gyro element 2 and the wiring is achieved through the fixing member 83. It is preferable that the fixing member 83 be formed of an elastic material. As the elastic fixing material 83, a conductive adhesive or the like in which silicone is used as a base material is known. Further, the inside of the container 81 is maintained in the vacuum atmosphere, and an upper opening of the container 81 is sealed by the cover 86.

In the gyro element 2, since the weights 13a, 13b, 13c and 13d that are provided in the first, second, third and fourth drive vibrating arms 441, 442, 443 and 444 include the first weights 12a, 12b, 12c and 12d and the second weights 11a, 11b, 11c and 11d, it is possible to reduce temperature drift of the gyro element 2. Accordingly, the gyro sensor 80 that uses the gyro element 2 also has a stable characteristic in which the temperature drift is reduced.

Electronic Apparatus

Next, an electronic apparatus to which the gyro element 2 that is the vibrator element according to one embodiment of the invention, the vibrator 1 that uses the gyro element 2 that is the vibrator element, or the gyro sensor 80 that is the electronic device is applied will be described in detail referring to FIGS. 12 to 14. In this description, an example in which the vibrator 1 that uses the gyro element 2 that is the vibrator element is applied will be described.

Figure 12:
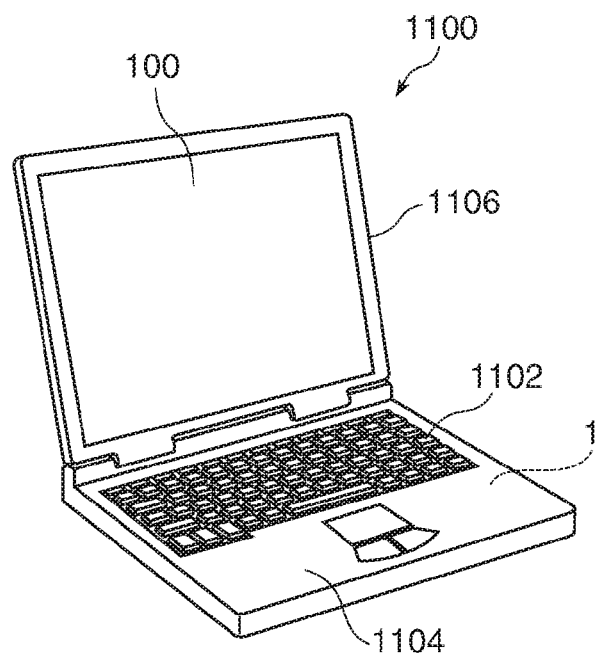
FIG. 12 is a perspective view illustrating a configuration of a mobile personal computer that is an example of an electronic apparatus.

FIG. 12 is a perspective view schematically illustrating a configuration of a mobile (notebook type) personal computer that is an electronic apparatus that includes the vibrator 1 according to the embodiment of the invention. In the figure, a personal computer 1100 includes a main body 1104 that includes a keyboard 1102, and a display unit 1106 that includes a display section 100. The display unit 1106 is supported to be rotatable to the main body 1104 through a hinge structure. The vibrator 1 that uses the gyro element 2 having a function of detecting an angular velocity is installed in the personal computer 1100.

Figure 13:
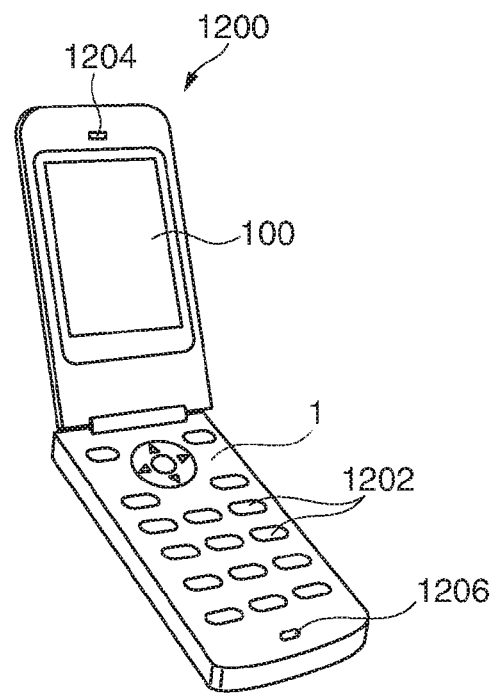
FIG. 13 is a perspective view illustrating a configuration of a mobile phone that is an example of an electronic apparatus.

FIG. 13 is a perspective view schematically illustrating a configuration of a mobile phone (also including PHS) that is an electronic apparatus that includes the vibrator 1 according to the embodiment of the invention. In the figure, a mobile phone 1200 includes plural operation buttons 1202, an ear piece 1204, and a mouth piece 1206. A display section 100 is disposed between the operation buttons 1202 and the ear piece 1204. The vibrator 1 that uses the gyro element 2 having a function as an angular velocity sensor is installed in the mobile phone 1200.

Figure 14:
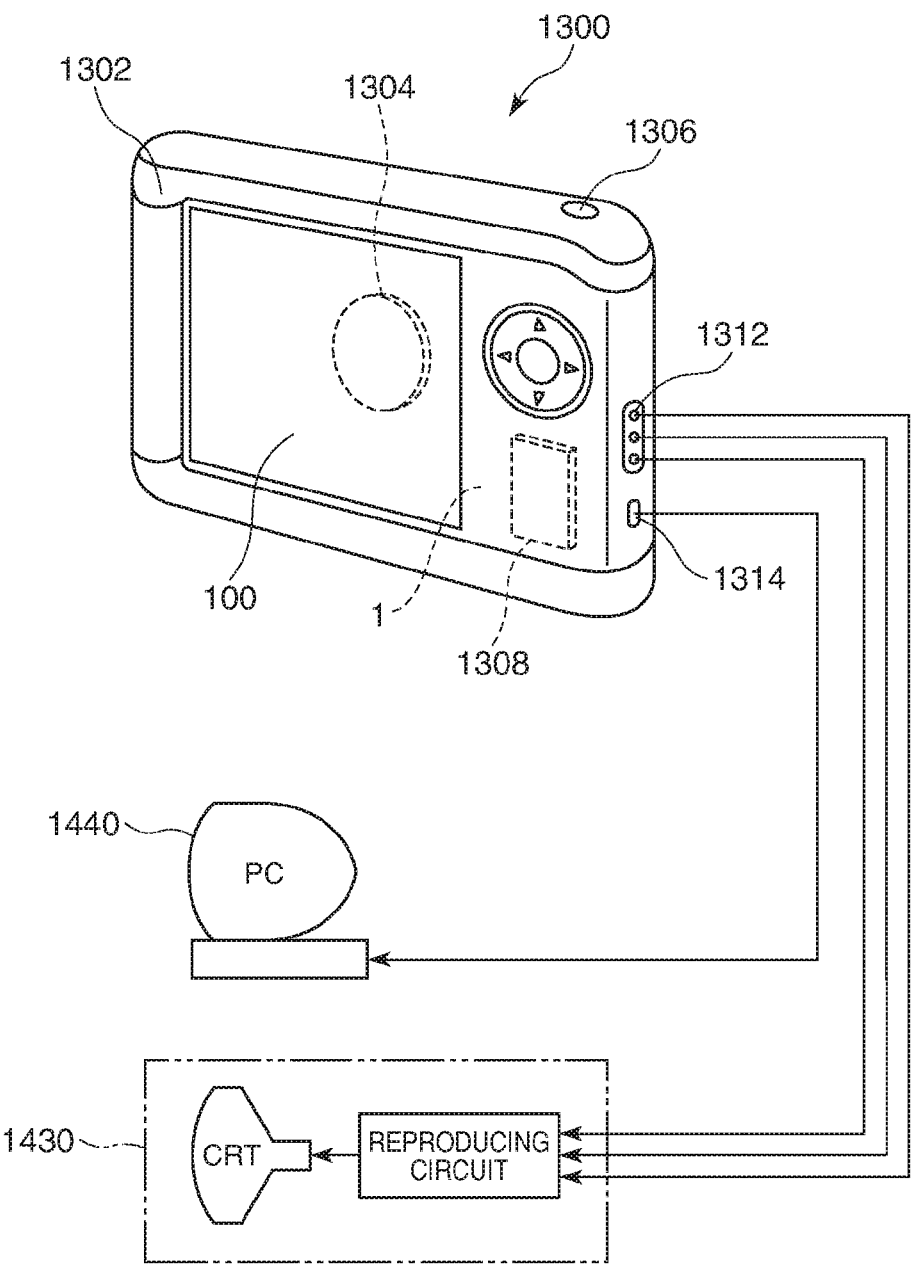
FIG. 14 is a perspective view illustrating a configuration of a digital still camera that is an example of an electronic apparatus.

FIG. 14 is a perspective view schematically illustrating a configuration of a digital still camera that is an electronic apparatus that includes the vibrator 1 according to the embodiment of the invention. In FIG. 14, connection with an external device is briefly shown. Here, a normal camera exposes a silver-halide photo film by a light image of an object, but a digital still camera 1300 performs photo-electric conversion for the light image of the object using an imaging element such as a charge coupled device (CCD) to generate an imaging signal (image signal).

The display section 100 is provided on a rear surface of a case (body) 1302 of the digital still camera 1300, which performs display on the basis of the imaging signal generated by the CCD. The display section 100 functions as a finder that displays the object as an electronic image. Further, a light receiving unit 1304 that includes an optical lens (imaging optical system), an CCD and the like is provided on a front side (rear side in the figure) of the case 1302.

If a user confirms the image of the object displayed on the display section 100 and presses a shutter button 1306, the imaging signal of the CCD at that time is transmitted to and stored in a memory 1308. Further, in the digital still camera 1300, a video signal output terminal 1312 and a data communication input and output terminal 1314 are provided on a side surface of the case 1302. As shown in the figure, a TV monitor 1430 is connected to the video signal output terminal 1312, and a personal computer 1440 is connected to the data communication input and output terminal 1314, as necessary. Further, the imaging signal stored in the memory 1308 is output to the TV monitor 1430 or the personal computer 1440 according to a predetermined operation. The vibrator 1 that uses the gyro element 2 that functions as an angular velocity sensor or the like is built in the digital still camera 1300.

The vibrator 1 according to the embodiment of the invention may be applied to electronic apparatuses such as an inkjet discharge apparatus (for example, inkjet printer), a laptop personal computer, a television, a video camera, a video tape recorder, a car navigation apparatus, a pager, an electronic organizer (including communication functions), an electronic dictionary, a calculator, an electronic game machine, a word processor, a workstation, a TV phone, a security TV monitor, electronic binoculars, a POS terminal, a medical apparatus (for example, electronic thermometer, sphygmomanometer, blood glucose monitoring system, electrocardiogram measurement apparatus, ultrasonic diagnostic apparatus, or electronic endoscope), a fish finder, various measurement apparatuses, meters (for example, meters of vehicles, airplanes or ships), a flight simulator, in addition to the personal computer (mobile personal computer) in FIG. 12, the mobile phone in FIG. 13 and the digital still camera in FIG. 14.

Moving Body

Figure 15:
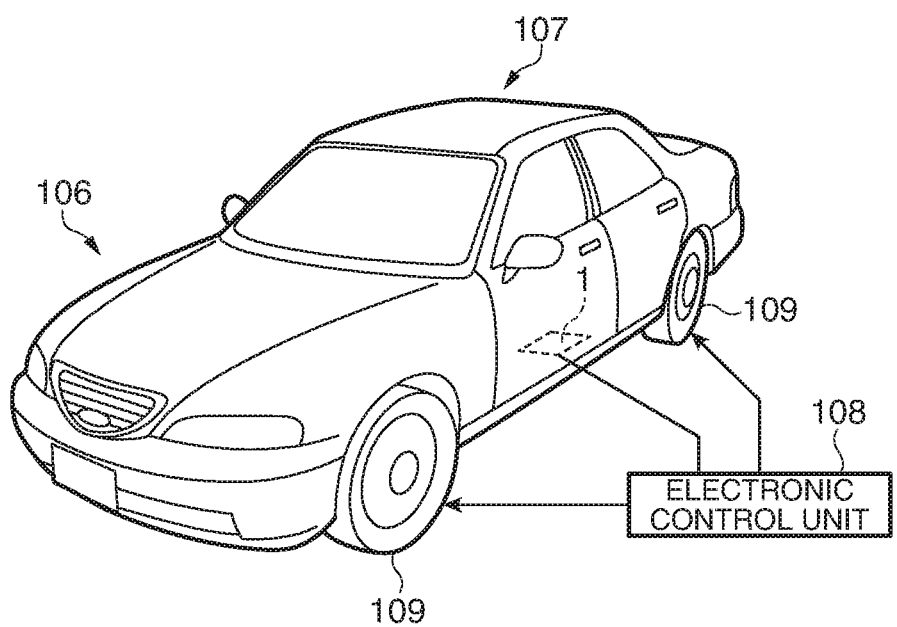
FIG. 15 is a perspective view illustrating a configuration of an automobile that is an example of a moving body.

FIG. 15 is a perspective view schematically illustrating an automobile that is an example of a moving body. The vibrator 1 that uses the gyro element 2 according to the embodiment of the invention is mounted in an automobile 106. For example, as shown in FIG. 15, in the automobile 106 that is the moving body, an electronic control unit 108 that is built therein with the vibrator 1 that uses the gyro element 2 to control a tire 109 or the like is mounted in a vehicle body 107. Further, the vibrator 1 may be widely applied to an electronic control unit (ECU) such as a keyless entry, an immobilizer, a car navigation system, a car air conditioner, an anti-lock braking system (ABS), an air bag, a tire pressure monitoring system (TPMS), an engine controller, a battery monitor of a hybrid automobile or electric automobile or a vehicle body attitude control system.

What is claimed is:

1. A vibrator element comprising:
   a base portion;
   a vibrating arm that extends from the base portion, the vibrating arm having a proximal end near the base and a distal end opposite the proximal end;
   a first weight provided at the distal end of the vibrating arm, the first weight being spaced apart from a tip of the vibrating arm toward the base portion; and
   a second weight that is provided between the first weight and the tip of the vibrating arm,
   wherein, an area of a first region where the first weight is provided is A1, an area of an entire region between an edge of the first weight and the tip of the vibrating arm is A2, a mass of the first weight is B1, and a mass of the second weight is B2, and
   B1/A1 > B2/A2.

2. The vibrator element according to claim 1,
   wherein the second weight has a width that is smaller than that of the first weight in a direction that is orthogonal to an extension direction of the vibrating arm.

3. The vibrator element according to claim 2,
   wherein the second weight is provided in an approximately central portion of the vibrating arm in a direction that is orthogonal to an extension direction of the vibrating arm.

4. The vibrator element according to claim 3,
   wherein the vibrating arm has a wide portion that is wider in a direction that is orthogonal to an extension direction of the vibrating arm in a plan view than a remainder of the vibrating arm, and
   wherein the first weight and the second weight are provided in the wide portion.

5. The vibrator element according to claim 2,
   wherein the second weight comprises a plurality of weights.

6. The vibrator element according to claim 5,
   wherein the vibrating arm has a wide portion that is wider in a direction that is orthogonal to an extension direction of the vibrating arm in a plan view than a remainder of the vibrating arm, and
   wherein the first weight and the second weight are provided in the wide portion.

7. The vibrator element according to claim 2,
   wherein the vibrating arm has a wide portion that is wider in a direction that is orthogonal to an extension direction of the vibrating arm in a plan view than a remainder of the vibrating arm, and
   wherein the first weight and the second weight are provided in the wide portion.

8. The vibrator element according to claim 1,
   wherein the second weight is provided in an approximately central portion of the vibrating arm in a direction that is orthogonal to an extension direction of the vibrating arm.

9. The vibrator element according to claim 8,
   wherein the vibrating arm has a wide portion that is wider in a direction that is orthogonal to an extension direction of the vibrating arm in a plan view than a remainder of the vibrating arm, and
   wherein the first weight and the second weight are provided in the wide portion.

10. The vibrator element according to claim 1,
    wherein the second weight comprises a plurality of weights.

11. The vibrator element according to claim 10,
    wherein the vibrating arm has a wide portion that is wider in a direction that is orthogonal to an extension direction of the vibrating arm in a plan view than a remainder of the vibrating arm, and
    wherein the first weight and the second weight are provided in the wide portion.

12. The vibrator element according to claim 1,
    wherein the first weight is spaced apart from side end of the vibrating arm, the side end extending along an extension direction of the vibrating arm.

13. The vibrator element according to claim 1,
wherein the vibrating arm has a wide portion that is wider in a direction that is orthogonal to an extension direction of the vibrating arm in a plan view than a remainder of the vibrating arm, and
wherein the first weight and the second weight are provided in the wide portion.

14. The vibrator element according to claim 1, further comprising:
a pair of detection vibrating arms that extend from the base portion in opposite directions.

15. A vibrator comprising:
the vibrator element according to claim 1; and
a package that accommodates the vibrator element.

16. An electronic device comprising:
the vibrator element according to claim 1; and
a circuit element that drives the vibrator element.

17. An electronic apparatus comprising the vibrator element according to claim 1.

18. A moving body comprising the vibrator element according to claim 1.

19. A method of manufacturing a vibrator element comprising:
forming a base portion and a vibrating arm that extend from the base portion, the vibrating arm having a proximal end near the base and a distal end opposite the proximal end;
forming a first weight at the distal end of the vibrating arm, the first weight being spaced apart from a tip of the vibrating arm toward the base portion;
forming a second weight between the first weight and the tip of the vibrating arm; and
adjusting a resonance frequency of the vibrating arm by one of:
removing at least a part of at least one of the first weight and the second weight, or
increasing a mass of at least one of the first weight and the second weight,
wherein an area of a first region where the first weight is provided is A1, an area of an entire region between an edge of the first weight and the tip of the vibrating arm is A2, a mass of the first weight is B1, and a mass of the second weight is B2, and
B1/A1 >B2/A2.

20. The method according to claim 19,
wherein the forming of the first weight and the forming of the second weight further comprises:
forming the first weight on the vibrating arm such that the first weight is spaced apart from the tip of the vibrating arm toward the base portion; and
forming the second weight in the region between the edge of the first weight and the tip of the vibrating arm.

* * * * *